United States Patent
Pau et al.

(10) Patent No.: US 9,671,538 B2
(45) Date of Patent: Jun. 6, 2017

(54) OPTICAL ELEMENTS COMPRISING CHOLESTERIC LIQUID CRYSTAL POLYMERS

(71) Applicant: The Arizona Board of Regents on Behalf of the Univeristy of Arizona, Tucson, AZ (US)

(72) Inventors: Stanley Pau, Tucson, AZ (US); Wei-Liang Hsu, Norwalk, CT (US)

(73) Assignee: The Arizona Board of Regents on behalf of the University of Arizona, Tucson, AZ (US)

( * ) Notice: Subject to any disclaimer, the term of this patent is extended or adjusted under 35 U.S.C. 154(b) by 136 days.

(21) Appl. No.: 14/440,493

(22) PCT Filed: Nov. 18, 2013

(86) PCT No.: PCT/US2013/070611
§ 371 (c)(1),
(2) Date: May 4, 2015

(87) PCT Pub. No.: WO2014/120325
PCT Pub. Date: Aug. 7, 2014

(65) Prior Publication Data
US 2015/0301249 A1    Oct. 22, 2015

Related U.S. Application Data

(60) Provisional application No. 61/796,774, filed on Nov. 19, 2012.

(51) Int. Cl.
*G02B 5/30* (2006.01)
*C09K 19/36* (2006.01)
*C09K 19/56* (2006.01)

(52) U.S. Cl.
CPC ............ *G02B 5/3016* (2013.01); *C09K 19/36* (2013.01); *C09K 19/56* (2013.01)

(58) Field of Classification Search
None
See application file for complete search history.

(56) References Cited

U.S. PATENT DOCUMENTS 5,602,661 A * 2/1997 Schadt .................. C08F 246/00
                                                            349/117
6,160,597 A * 12/2000 Schadt .................. C08F 246/00
                                                            349/98

(Continued)

FOREIGN PATENT DOCUMENTS

KR   10-2009-0004696   1/2009
KR   10-2010-0024387   3/2010

OTHER PUBLICATIONS

Hsu et al., "Patterned cholesteric liquid crystal polymer film," J.Opt.Soc. Am. A., 30(2): 252-258, 2013.*

(Continued)

*Primary Examiner* — Ryan Crockett
(74) *Attorney, Agent, or Firm* — Klarquist Sparkman, LLP

(57) ABSTRACT

A linear photopolymerizable polymer (LPP) layer is situated to align liquid crystal molecules in a cholesteric liquid crystal polymer (Ch-LCP) layer situated at or on the LPP layers. The Ch-LCP layer includes a patterned area and an unpatterned area. The patterned area and the un-patterned area have different optical properties. The Ch-LCP layer can be tuned to transmit light of a desired frequency and handedness. Single and multiple-layered LPP/Ch-LCP and/or LPP/LCP structures can be provided as patterned polarizers, patterned retarders and other devices.

27 Claims, 17 Drawing Sheets

(56) References Cited

U.S. PATENT DOCUMENTS

| | | | | |
|---|---|---|---|---|
| 6,496,287 | B1* | 12/2002 | Seiberle | B42D 25/328 349/113 |
| 6,734,936 | B1* | 5/2004 | Schadt | G02B 5/30 349/117 |
| 2002/0027624 | A1* | 3/2002 | Seiberle | G02B 5/3016 349/73 |
| 2003/0035191 | A1* | 2/2003 | Moia | G06K 19/06046 359/281 |
| 2010/0059709 | A1 | 3/2010 | Bachels et al. | |
| 2012/0105783 | A1* | 5/2012 | Pau | C09K 19/38 349/127 |
| 2012/0169950 | A1 | 7/2012 | Tatzel et al. | |

OTHER PUBLICATIONS

Bachman et al., "Spiral plasmonic nanoantennas as circular polarization transmission filters," *Opt. Express*, 20: 1308, 2012.

Gruev et al., "Fabrication of a dual-tier thin film micropolarization array," *Opt. Express*, 15: 4994-5007, 2007.

Harding et al., "Reactive liquid crystal materials for optically anisotropic patterned retarders," *Proc. SPIE*, 7140: 71402J, 2008.

Harnett et al., "Liquid-crystal micropolarizer array for polarization-difference imaging," *Appl. Opt.*, 41: 1291-1296, 2002.

Hegde et al., "Periodic anchoring Condition for Alignment of a Short Pitch Cholesteric Liquid Crystal in Uniform Lying Helix Texture," *Appl. Phys. Lett.*, 96: 113503, 2010.

Hsu et al., "Full-Stokes imaging polarimeter using an array of elliptical polarizer," *Optics Express*, 22: 3063, 2014.

Hsu et al., "Infrared liquid crystal polymer micropolarizer," *Appl. Opt.*, 53: 5252, 2014.

Hsu et al., "Patterned cholesteric liquid crystal polymer film," *J. Opt. Soc. Am. A.*, 30(2): 252-258, 2013.

Jeong et al., "3D Liquid Crystal Display with Single Polarizer and Patterned Retarder Structure," *IDW '11*, pp. 1579-1582, 2011.

Komitov et al., "Alignment of cholesteric liquid crystals using periodic anchoring," *J. Appl. Phys.*, 86: 3508-3511, 1999.

Kurioz et al., "P-128: Orientation of a Reactive Mesogen on Photosensitive Surface," *SID 07 Digest*, pp. 688-690, 2007.

Kurochkin et al., "Light-controlled alignment of cholesteric liquid crystals on photosensitive materials," *Mol. Cryst. Liq. Cryst.*, 453: 333-341, 2006.

Lee et al., "Designs of broadband and wide-view patterned polarizers for stereoscopic 3D displays," *Opt. Express*, 18: 27079-27094, 2010.

Myhre et al., "Imaging capability of patterned liquid crystals," *Appl. Opt.*, 48: 6152-6158, 2009.

Myhre et al., "Patterned color liquid crystal polymer polarizers," *Opt. Express*, 18: 27777-27786, 2010.

Nordin et al., "Micropolarizer array for infrared imaging polarimetry," *J. Opt. Soc. Am. A*, 16: 1168-1174, 1999.

Novak et al., "Analysis of a micropolarizer array-based simultaneous phase-shifting interferometer," *Appl. Opt.*, 44: 6861-6868, 2005.

PCT International Search Report and Written Opinion for PCT Application No. PCT/US2013/070611, 12 pages, Aug. 27, 2014.

Peltzer et al., "Ultra-high extinction ratio micropolarizers using plasmonic lenses," *Opt. Express*, 19: 18072, 2011.

Schadt et al., "Surface-induced parallel alignment of liquid crystals by linearly polymerized photopolymers," *Jpn. J. Appl. Phys.*, 31: 2155-2164, 1992.

Twietmeyer et al., "Mueller matrix retinal imager with optimized polarization conditions," *Opt. Express*, 16: 21339-21354, 2008.

Zhao et al., "Liquid-crystal micropolarimeter array for full Stokes polarization imaging in visible spectrum," *Opt. Express*, 18: 17776-17787, 2010.

* cited by examiner

PRIOR ART

| 504₁₁ | | | | 504₁₅ |
|---|---|---|---|---|
| 504₂₁ | | | | |
| 504₃₁ | | | | |
| 504₄₁ | | | | 504₄₅ |

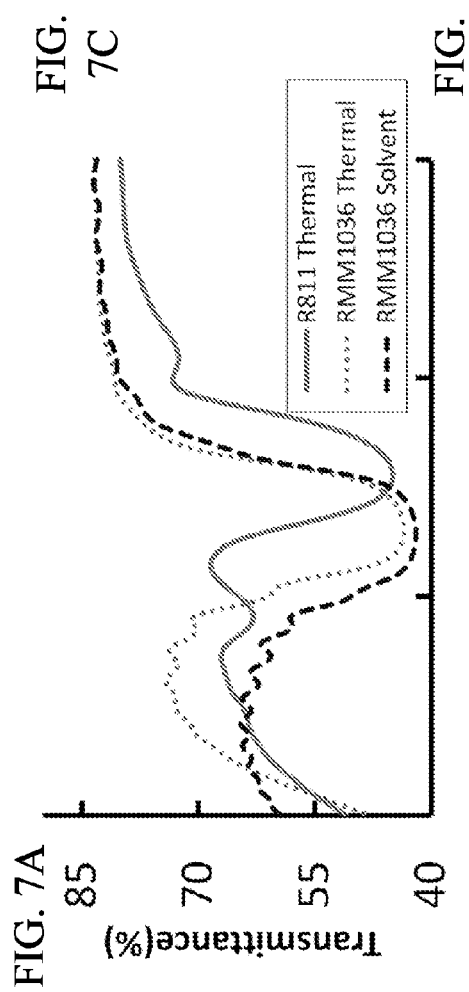
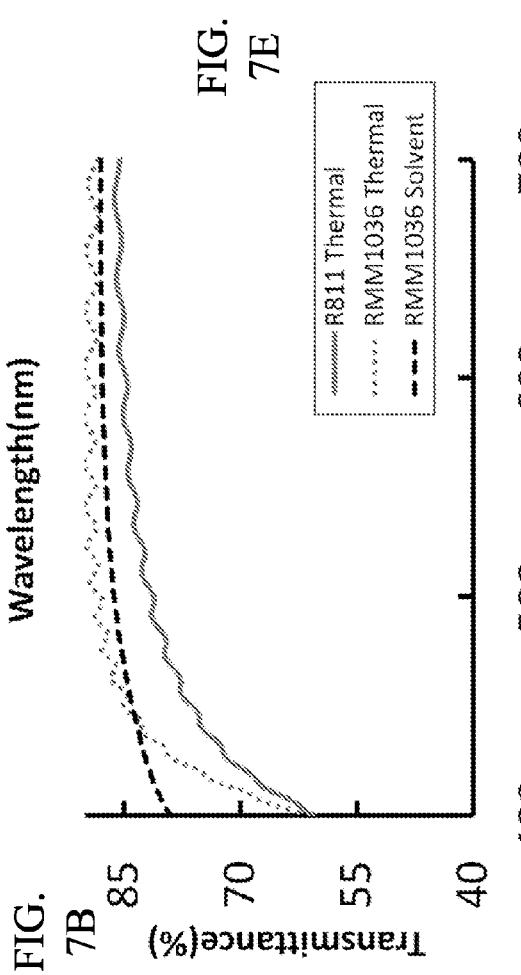
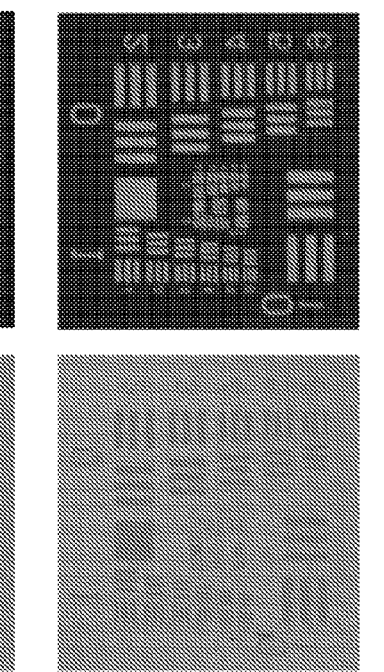
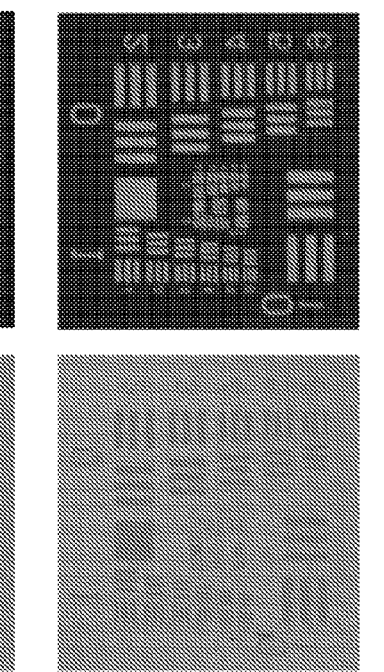
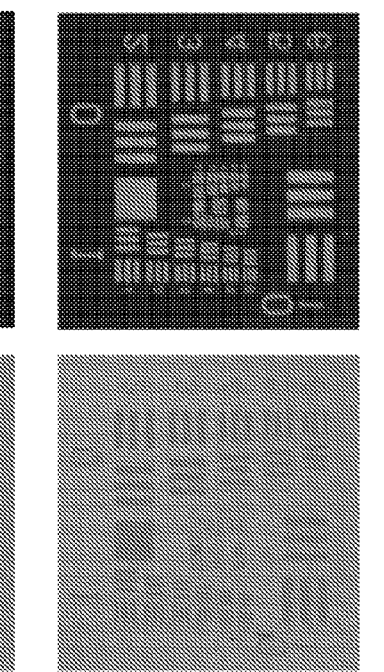
FIG. 7A
FIG. 7B
FIG. 7C
FIG. 7D
FIG. 7E

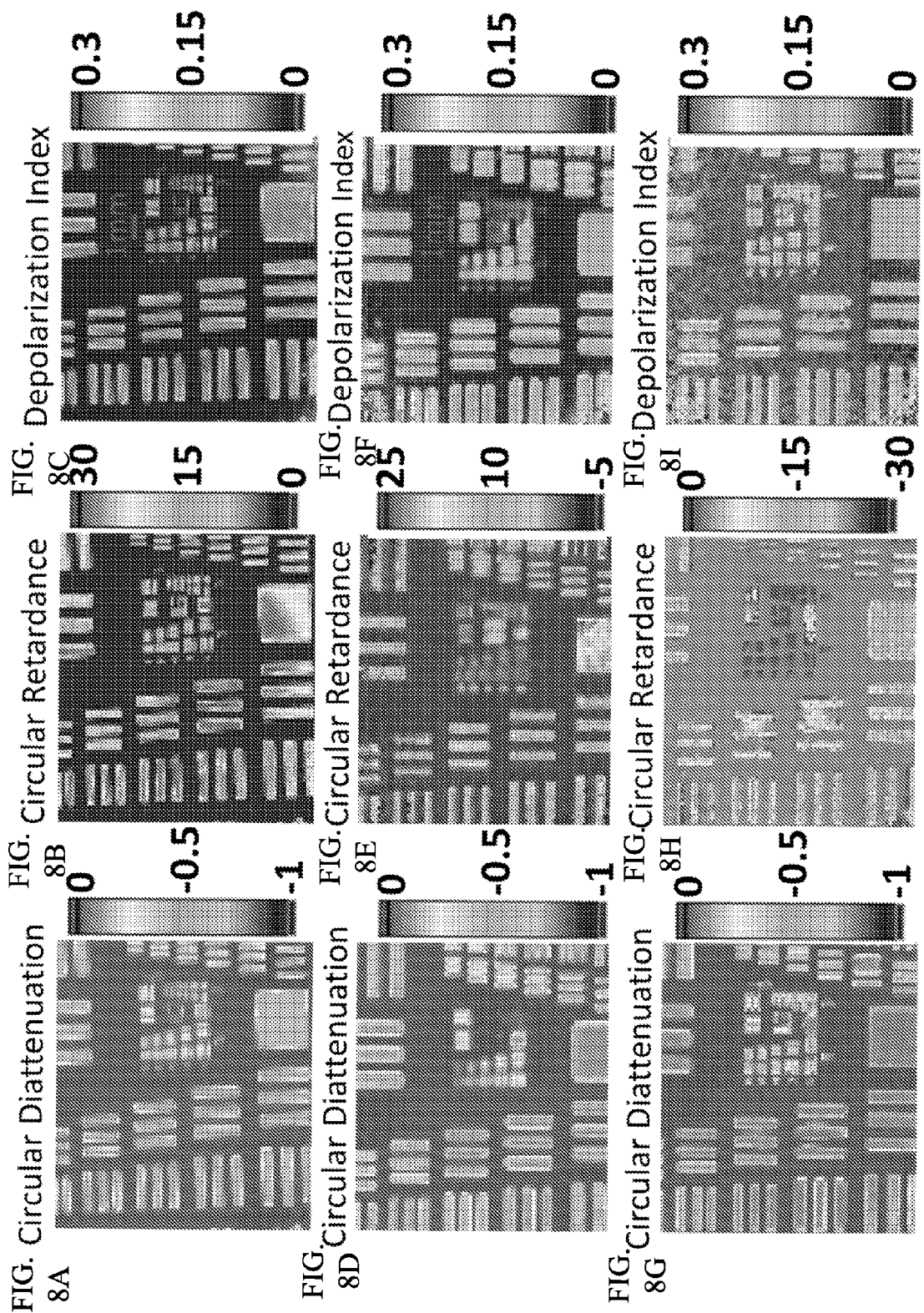

OPTICAL ELEMENTS COMPRISING CHOLESTERIC LIQUID CRYSTAL POLYMERS

CROSS REFERENCE TO RELATED APPLICATIONS

This is the §371 U.S. National Stage of International Application No. PCT/US2013/070611, filed Nov. 18, 2013, which was published in English under PCT Article 21(2), which in turn claims priority to and the benefit of U.S. Provisional Application No. 61/796,774, filed Nov. 19, 2012, which is hereby incorporated herein by reference in its entirety.

ACKNOWLEDGMENT OF GOVERNMENT SUPPORT

This invention was made with government support under Grant No. FA9550-09-1-0669 awarded by USAF/AFOSR. The government has certain rights in the invention.

FIELD

The disclosure pertains to, inter alia, optical devices such as polarizers, retardation plates, and oriented light emitters.

BACKGROUND

Polarizers are used in a variety of applications such as liquid crystal displays, three-dimensional displays, medical imaging, polarimetry, and interferometry. A polarizer is an optical device that transmits light of one polarization and blocks or absorbs light of different polarizations. A polarizer can be fabricated to transmit linearly, circularly, or elliptically polarized light. Linear polarizers can be fabricated by exploiting the optical properties of birefringence or dichroism. For example, etched dichroic polymers and wire-grid polarizers are existing conventional techniques well-suited for fabricating linear polarizers. However, circular and elliptical polarization elements are more difficult to construct.

Liquid crystal materials may exhibit desirable optical properties, such as birefringence, when molecules of the liquid crystal are aligned in some liquid crystal phases. Surface treatments in contact with the liquid crystal material may aid the alignment of the molecules of the liquid crystals. An example surface treatment is a thin film, such as a polyimide layer, formed on a surface of a substrate. The polyimide layer can be formed into an alignment layer for the liquid crystal by mechanically rubbing the polyimide layer in a single direction along the direction of alignment. Thus, the molecules of the liquid crystal material in contact with the polyimide layer may be aligned with the rubbing direction of the polyimide. However, rubbed polyimide has some potential disadvantages, such as surface defects, particle generation, and electrostatic charging. Alternatively, non-contact methods for producing an alignment layer may avoid some of the disadvantages of contact methods. Non-contact methods for aligning the molecules of the liquid crystal material include alignment using an atomic force microscope or an ion beam. However, these non-contact methods are impractical for large areas.

SUMMARY

In one example, a method comprises forming a photopolymerizable polymer network (PPN) layer for liquid crystal alignment. The molecules of the PPN layer are aligned with each other in at least one alignment direction. A cholesteric liquid crystal polymer (Ch-LCP) layer is formed proximate the PPN layer so that liquid crystal molecules in the Ch-LCP layer are aligned with the at least one alignment direction. A patterned region of the Ch-LCP layer may be formed. The patterned region of the Ch-LCP layer may be cured in a cholesteric state. Curing the patterned region may comprise polymerizing liquid crystal molecules of the patterned region by exposing the molecules to ultraviolet light. The Ch-LCP layer may comprise a chiral dopant, and the concentration of the chiral dopant may be adjusted to tune the transmittance of a selected wavelength of light through the Ch-LCP layer. An unpatterned region of the Ch-LCP layer may be cured in an isotropic state. The unpatterned region of the Ch-LCP layer may be cured by thermal annealing. Thermal annealing may comprise heating the Ch-LCP layer to a temperature greater than a clear-point temperature of the Ch-LCP layer. Curing the unpatterned region may comprise polymerizing liquid crystal molecules of the unpatterned region by exposing the molecules to ultraviolet light. Alternatively, the unpatterned region of the Ch-LCP layer may be removed, such as with a solvent rinse.

In another example, a method comprises forming an alignment layer on a substrate. Molecules of the alignment layer are aligned with each other in at least one alignment direction. A cholesteric liquid crystal polymer (Ch-LCP) layer is formed proximate the alignment layer in a patterned manner so that liquid crystal molecules in at least a patterned region of the Ch-LCP layer are aligned to the at least one alignment direction. The Ch-LCP layer is processed to produce an optical property of the patterned region of the Ch-LCP layer that is different than a corresponding optical property of an unpatterned region of the Ch-LCP layer. The alignment layer may comprise a photopolymerizable polymer network (PPN) layer. The at least one alignment direction may be established by exposing the PPN to linearly polarized ultraviolet radiation. Processing the Ch-LCP layer may comprise exposing at least a selected region of Ch-LCP layer to patterned linearly polarized ultraviolet radiation, removing the unpatterned region(s), curing the patterned region in a cholesteric phase, curing the unpatterned region in an isotropic phase, and/or thermal annealing. The concentration of chiral dopant added to the cholesteric liquid crystal polymer of the Ch-LCP layer may be adjusted to produce a corresponding tuned transmittance of a central wavelength of light transmitted through the Ch-LCP layer.

An example device comprises a linear photopolymerizable polymer (LPP) layer having molecules defining at least one alignment direction, and a cholesteric liquid crystal polymer (Ch-LCP) layer proximate the LPP layer such that liquid crystal molecules in a patterned area of the Ch-LCP layer are aligned with the at least one alignment direction. The patterned area of the Ch-LCP layer may have different optical properties than an unpatterned area of the Ch-LCP layer.

Another example device comprises a substrate, an alignment layer situated on the substrate, and a first cholesteric liquid crystal polymer (Ch-LCP) layer situated on the alignment layer. The alignment layer comprises at least one selected region in which molecules are aligned with each other in at least one alignment direction. The alignment layer may be a linear photo-polymerizable polymer (LPP) layer. The first Ch-LCP layer includes liquid crystal molecules that, in the at least one selected region, are aligned with the at least one alignment direction, wherein the first Ch-LCP layer includes a patterned area and an unpatterned area. The patterned area and the unpatterned area have at least one different optical property. The patterned area of the first Ch-LCP layer may be polymerized in a cholesteric phase. The unpatterned area of the first Ch-LCP layer may be polymerized in an isotropic phase. The example device may further comprise a second Ch-LCP layer overlaying at least part of the first Ch-LCP layer. The second Ch-LCP layer may comprise a patterned region polymerized in a cholesteric phase. The second Ch-LCP layer may overlay at least part of the first Ch-LCP layer so that at least part of the patterned region of the second Ch-LCP layer overlays at least part of the unpatterned area of the first Ch-LCP layer. The first Ch-LCP layer may comprise a chiral dopant having a first handedness and the second Ch-LCP layer may comprise a chiral dopant having a second handedness that is opposite the first handedness. The first Ch-LCP layer may comprise a chiral dopant concentration tuned to a first wavelength. The second Ch-LCP layer comprises a chiral dopant concentration tuned to a second wavelength different from the first wavelength.

An example filter comprises a substrate, a linear photo-polymerizable polymer (LPP) layer, a cholesteric liquid crystal polymer (Ch-LCP) layer, and a layer pair. The LPP layer is supported by the substrate and defines at least one alignment direction. The Ch-LCP layer is proximate the alignment layer such that liquid crystal molecules of the Ch-LCP layer are aligned with the at least one alignment direction. The Ch-LCP layer includes a patterned area cured in the cholesteric phase. The layer pair is at least partially overlapping the Ch-LCP layer. The layer pair includes an LPP alignment layer and a liquid crystal polymer (LCP) layer situated so as to align respective molecules thereof with respect to the LPP alignment layer. The LCP layer includes a dichroic dye.

The foregoing and other aspects of the disclosed technology will become more apparent from the following detailed description, which proceeds with reference to the accompanying figures.

BRIEF DESCRIPTION OF THE DRAWINGS

FIGS. 7A-7E shows exemplary transmission spectra and images of sample devices.

FIGS. 8A-8I shows measured values for the depolarization index, circular diattenuation (CD), and circular retardance (CR) of sample devices.

DETAILED DESCRIPTION

Terms and Abbreviations

Figure 1A:
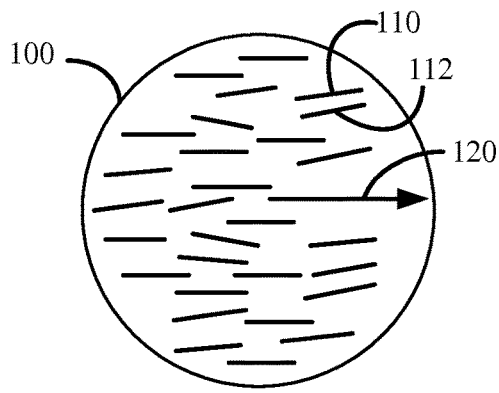
FIGS. 1A-1B illustrate aspects of a cholesteric liquid crystal polymer (Ch-LCP).

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and are not intended to be limiting. Other features of the disclosure are apparent from the following detailed description and the claims.

Unless otherwise indicated, all numbers expressing quantities of ingredients, properties such as molecular weight, percentages, and so forth, as used in the specification or claims are to be understood as being modified by the term "about." Accordingly, unless otherwise indicated, implicitly or explicitly, the numerical parameters set forth are approximations that may depend on the desired properties sought, limits of detection under standard test conditions/methods, limitations of the processing method, and/or the nature of the parameter or property. When directly and explicitly distinguishing embodiments from discussed prior art, the embodiment numbers are not approximates unless the word "about" is recited.

Chiral: A spatial configuration in which a structure and its mirror image are not superimposable. Chiral compounds are typically optically active; large organic molecules often have one or more chiral centers in which four different groups are attached to a carbon atom.

Chiral dopant: A chiral substance that is added in small amounts to a liquid crystal polymer to form a cholesteric liquid crystal polymer.

Circularly polarized: Refers to circular polarization of electromagnetic radiation (e.g., light) in electrodynamics. Circular polarization of a propagating electromagnetic wave is a polarization state in which the electric field of the passing wave does not change magnitude but changes direction in a rotary manner.

Cholesteric liquid crystal polymer (Ch-LCP): A liquid crystal polymer doped with chiral molecules, as further described with reference to FIGS. 1A-1B. The molecules of a Ch-LCP are capable of aligning with each other in a chiral nematic phase in which respective molecules within a plane align with a director in the plane. A "director" is a vector pointing in a direction of the temporal and spatial average of the long-range orientational order of the liquid crystal. A twist angle between molecules in adjacent planes results in a longer-range chiral order. A Ch-LCP can reflect circularly polarized light incident along a helical axis of the Ch-LCP. A Ch-LCP can reflect elliptically polarized light incident at an oblique angle to the helical axis of the Ch-LCP.

Dispersion: A phenomenon in which the refractive index of a material is a function of the wavelength of the traversing light wave.

Dopant: A substance added in small amounts to a pure material to alter one or more properties of the material.

Elliptically polarized: Refers to elliptical polarization of electromagnetic radiation in electrodynamics. In a propagating electromagnetic wave that is elliptically polarized, a tip of the electric field vector of the passing wave describes an ellipse in any fixed plane intersecting, and normal to, the direction of propagation.

Linearly photo-polymerizable polymer (LPP): A polymer that becomes polymerized in a given direction when exposed to linearly polarized light.

Linearly polarized: Refers to linear polarization of electromagnetic radiation in electrodynamics. In a propagating electromagnetic wave that is linearly polarized, the electric field vector or magnetic field vector is confined to a given plane extending in the direction of propagation.

Liquid crystal (LC): A state of matter having properties of both a liquid and a solid crystal. For example, the LC may flow like a liquid, but its molecules may be oriented in a crystal-like way. There are many different types of LC phases, which can be distinguished by their different optical properties (such as birefringence). Liquid crystal phases include at least nematic, cholesteric, and isotropic phases.

Liquid crystal polymer (LCP): A class of aromatic polyester polymers that exhibit liquid crystallinity. LCP can be prepared by dissolving a polymer in a solvent or by heating a polymer above its glass or melting transition point. Liquid-crystal polymers are capable of forming regions of highly ordered molecular structure while remaining in the liquid phase.

Micropolarizer: a miniaturized polarizer having typical dimensions on the order of a micron.

Nematic: One of the most common LC phases is the nematic phase. In the nematic phase, calamitic or rod-shaped organic LC molecules have no positional order, but they self-align to have long-range directional order, with their long axes being roughly parallel. Most nematics are uniaxial: they have one axis that is longer and preferred, and the other two axes are equivalent (can be approximated as cylinders or rods). Aligned nematics have the optical properties of uniaxial crystals, making them useful in liquid crystal displays.

Photoalignment: The light-induced alignment of certain liquid crystal molecules with each other.

Photo-oriented polymer networks (PPN): a polymer network that is aligned using polarized ultraviolet light lithography. PPNs are also referred to as linear photo-polymerizable polymers (LPPs).

Photopolymerizable polymer: A polymer that can polymerize when exposed to certain wavelengths of light.

Photopolymerization: In polymer chemistry, a process of reacting monomer molecules together in a chemical reaction to form three-dimensional networks or polymer chains when exposed to light.

Pitch length: The pitch length, p, refers to the distance over which the LC molecules undergo a full 360° twist (but note that the structure of the chiral nematic phase repeats itself every half-pitch, since in this phase directors at 0° and ±180° are equivalent). The pitch may change with corresponding changes in temperature or when other molecules are added to the LC host. In liquid crystal systems, the pitch is of the same order as the wavelength of incident light.

Polarized light: Refers to polarization of a propagating electromagnetic wave of electromagnetic radiation in electrodynamics. Polarization is a property of waves that oscillate with more than one orientation.

Polarizer: An optical filter that passes light of a specific polarization and blocks light of other polarizations. For example, a polarizer can convert a beam of light of undefined or mixed polarization into a beam with a well-defined polarization.

Polymerizable: A property of certain compounds that can be polymerized, such as linking together of monomers and/or oligomers, or crosslinking of existing polymer molecules.

Ultraviolet (UV) radiation: Electromagnetic radiation having wavelengths from about 10 nm to about 400 nm.

The systems, apparatus, and methods described herein should not be construed as being limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Overview

Patterned and oriented arrangements of anisotropic molecules or micro/nanocrystals on a large-area substrate have many applications in optical and electronic devices. One technique for creating an alignment layer is to form a thin film on a substrate and then to mechanically rub the thin film in the desired direction. For example, a polyimide can be mechanically rubbed with a cloth in a single direction to form an alignment layer. The molecules of a liquid crystal material in contact with the polyimide layer may be aligned with the rubbing direction of the polyimide. However, rubbed polyimide has some disadvantages, such as surface defects, particle generation, and electrostatic charging. Non-contact methods for aligning the molecules of a liquid crystal material may avoid some or all of the surface contamination and/or defects caused by mechanical alignment techniques. Traditional non-contact alignment techniques include alignment with an atomic force microscope or an ion beam. However, these non-contact methods are impractical for large areas and/or high volume manufacturing.

Another non-contact alignment technique is based on photo-oriented polymer networks (PPN) that can be used as alignment layers in liquid crystal guest-host systems. In this technique, the PPN is aligned using polarized ultraviolet light lithography on a substrate, as described in U.S. Pat. Nos. 5,389,698 and 6,496,239, both being incorporated herein by reference in their respective entireties.

A PPN layer that includes one or more orientation directions established by single or multiple exposure to polarized ultraviolet radiation is referred to herein as an "oriented" or "aligned" PPN layer. PPNs are also referred to herein as linear photo-polymerizable polymers (LPPs). In some examples, alignment of an LCP layer with an oriented PPN layer can be accomplished even if there are one or more intervening layers, and contact of the two layers with each other is not required.

On a substrate, a layer of a liquid crystal polymer (LCP) can be coated on an aligned PPN layer so as to align the LCP molecules with the PPN and to form an LCP-based device, as described in U.S. patent application Ser. No. 13/287,910, filed on Nov. 2, 2011, and which is incorporated herein by reference in its entirety. In one embodiment, the LCP can be mixed with functionalized dichroic chromophores (referred to as the "guest") that are soluble in the liquid crystal polymer (referred to as the "host"). The LCP layer can include one or more guest materials such as one or more fluorophores, dichroic dyes, carbon nanotubes, organic semiconductors, or other guest materials.

LCPs are also referred to herein as "reactive mesogens," and generally are based on liquid crystal materials having one or more polymerizable groups such as acrylates. Such materials can be polymerized into films, typically by exposure to UV radiation. The liquid crystal structure is then fixed by polymerization. Such LCP layers can be applied to rigid or deformable substrates, such as glass, plastics, metal foils, or other surfaces.

As disclosed herein, a layer of cholesteric liquid crystal polymer (Ch-LCP) can be coated on top of an aligned PPN, wherein the Ch-LCP molecules align with the molecules of the PPN to form a Ch-LCP-based device. Generally, a Ch-LCP is a mixture of a chiral dopant and a reactive mesogen that can be permanently fixed in the liquid crystal phase by exposure to ultraviolet (UV) illumination.

Figure 1B:
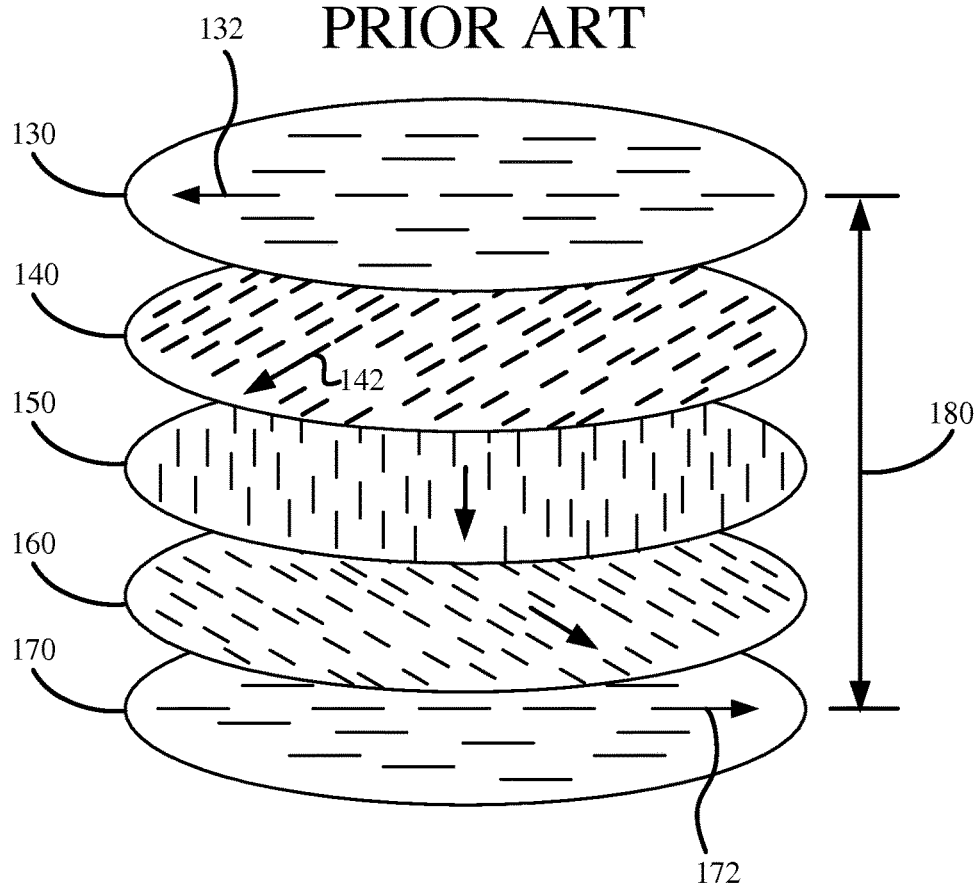

Certain aspects of a cholesteric liquid crystal polymer (Ch-LCP) are illustrated in FIGS. 1A-1B. In FIG. 1A, a plane 100 within a cholesteric liquid crystal is shown. Within the plane 100 are many liquid crystal molecules, such as molecules 110 and 112. The liquid crystal molecules have a rod-like structure which tends to orient the molecules generally parallel to neighboring molecules. For example, in the plane 100, the molecules 110 and 112 are about parallel to each other and to a director 120 within plane 100. The director 120 is a vector pointing in a direction of the temporal and spatial average of the long-range orientational order of the liquid crystal in the plane 100. FIG. 1B illustrates respective orientations of molecules in parallel planes 130, 140, 150, 160, and 170 of a Ch-LCP. As described with reference to FIG. 1A, the molecules within a respective plane are substantially parallel to a director of the plane. For example, the rod-like molecules in the plane 130 are substantially parallel to a director 132. Similarly, the rod-like molecules in the parallel plane 140 are substantially parallel to a director 142. The directors of adjacent planes are usually rotated from plane to plane within the cholesteric liquid crystal according to the concentration and helical twisting power of a chiral dopant. The rotation is quantified by the pitch of the Ch-LCP. The pitch is the distance between planes in which the directors of the respective planes are pointed in the same direction. In other words, the pitch is the distance over which the Ch-LCP molecules make a 360° twist. In FIG. 1B, the distance 180 is the distance between the plane 130 and the plane 170. The distance 180 is the pitch divided by two, which is the distance in which the Ch-LCP molecules make a 180° twist. Thus, the director 132 of the plane 130 is oriented in the opposite direction of the director 172 of the plane 170. As described below and with reference to FIGS. 4A-4C, the optical properties of the Ch-LCP are affected by the pitch and the handedness of the Ch-LCP.

Chiral dopants can be left-handed or right-handed. As described later below with reference to FIG. 4A, a Ch-LCP layer including a right-handed chiral dopant can be formed to act as a left-circular polarizer. For example, the Ch-LCP layer can be cured in a cholesteric phase so that left-handed circularly polarized light is transmitted through the Ch-LCP film and right-handed circularly polarized light is reflected by the periodic helical structure of the cholesteric phase. Similarly, a Ch-LCP layer including a left-handed chiral dopant can be formed to act as a right-handed circular polarizer in transmission mode.

According to representative fabrication methods set forth below, a Ch-LCP patterned device can be formed on CCD image-sensor arrays, and CMOS image-sensor arrays, or on arrays of a pixelated display. In one embodiment, one or more layers of a Ch-LCP patterned device are combined with one or more layers of a LCP patterned device. The disclosed devices and methods are described below with reference to generic devices, structures, and methods, followed by numerous specific examples.

Representative Devices

Figure 2A:
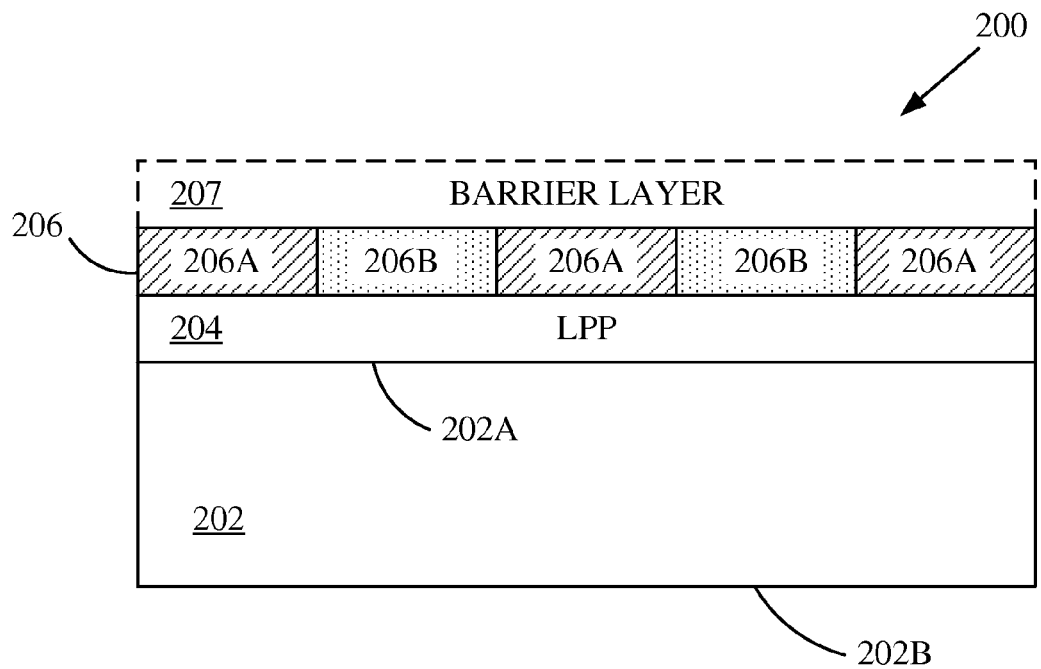
FIGS. 2A-2D are sectional and plan views of a representative Ch-LCP-based patterned device.
Figure 2B:
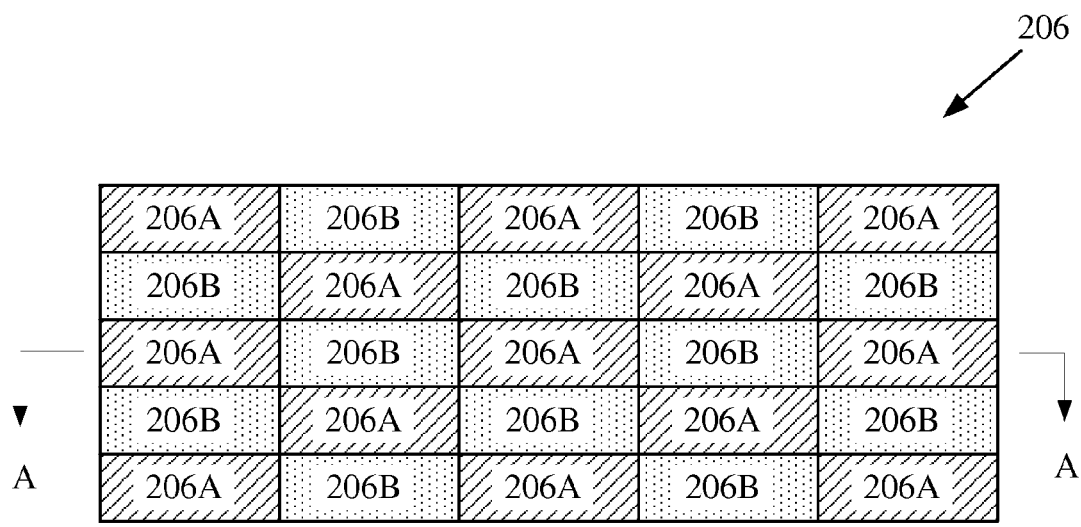

A representative single-layer device 200 is illustrated in FIGS. 2A-2B, where FIG. 2A illustrates a sectional view of the device 200, and FIG. 2B illustrates a plan view of the device 200. A substrate 202 having planar surfaces 202A, 202B is coated with an LPP layer 204 on the surface 202A.

The substrate 202 can be glass, fused silica, silicon, germanium, soda lime, or any other material suited for a particular application. For example, some applications may require high transmission of visible light, so that optically transparent substrates are used. Alternatively, conducting substrates, or light-absorbing or light-blocking substrates, can be used. Although not shown in FIG. 2A, the substrate 202 can comprise other coatings or surface treatments, wherein the LPP layer 204 is situated on these coatings or surface treatments. For example, the surface 202A can include an electrically conductive coating such as a metallic coating, or a transparent conductive coating such as indium tin oxide (ITO).

Rigid and/or planar substrates are not required; planar configurations are described herein for convenient illustration. The substrate 202 can be flexible and/or non-planar. For example, the substrate 202 may comprise a semiconductor substrate (e.g., a semiconductor wafer) having devices defined thereon, or the substrate 202 may a pre-fabricated device such as an image sensor or display. The substrate 202 may comprise barrier and/or planarization layers situated between devices of the substrate 202 and the LPP layer 204.

In one embodiment, the LPP layer 204 is exposed to linearly polarized light so that the molecules of the LPP layer 204 became aligned in one direction to correspondingly align molecules of the Ch-LCP layer 206. In an alternative embodiment, the LPP layer 204 is patterned by exposure to linearly polarized light through a mask, so that the molecules of the exposed or patterned LPP layer 204 can provide alignment of the Ch-LCP layer 206. For example, the LPP layer 204 can be patterned to have multiple aligned and/or unaligned regions, wherein the aligned regions are formed by exposure to linearly polarized UV radiation, and the unaligned regions are formed by using a mask to block linearly polarized UV radiation from reaching them. Thus, the Ch-LCP layer 206 can have alignment regions 206A corresponding to an alignment in the LPP layer. The liquid crystal molecules of the Ch-LCP layer 206 in contact with the aligned LPP layer can be cured in the planar state of the cholesteric phase. The Ch-LCP layer 206 can have unaligned regions (not shown) corresponding to unaligned regions in the LPP layer. The liquid crystal molecules of the Ch-LCP layer 206 in contact with the unaligned LPP layer can be cured in the focal conic state of the cholesteric phase.

The Ch-LCP layer 206 may include arbitrarily patterned areas. Each patterned area may have material or optical properties that differ from other patterned areas. As illustrated in FIG. 2B, the Ch-LCP layer 206 includes a patterned array, e.g., a checker-board array of representative Ch-LCP areas 206A and 206B, each having different respective optical properties. For example, the Ch-LCP area 206A may include Ch-LCP that is cured in a cholesteric phase to maintain the periodic helical structure of the liquid crystal molecules in the Ch-LCP. In this manner, the Ch-LCP area 206A may form a circular polarizer. The Ch-LCP areas 206B may include Ch-LCP that is cured in an isotropic state, which may be generally optically transparent for given wavelength(s) and/or polarization(s) of incident light. The Ch-LCP layer 206 can comprise more or fewer patterned areas; a checkerboard array is shown for convenient illustration. In certain alternative embodiments, the patterned areas in a row or column are cured in a cholesteric phase, with adjacent rows or columns being cured in an isotropic state.

Figure 2C:
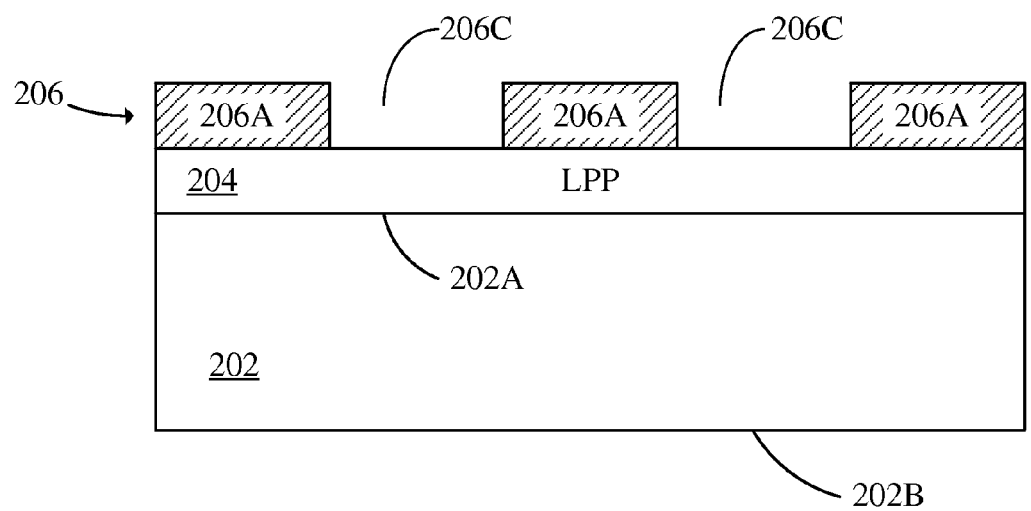
Figure 2D:
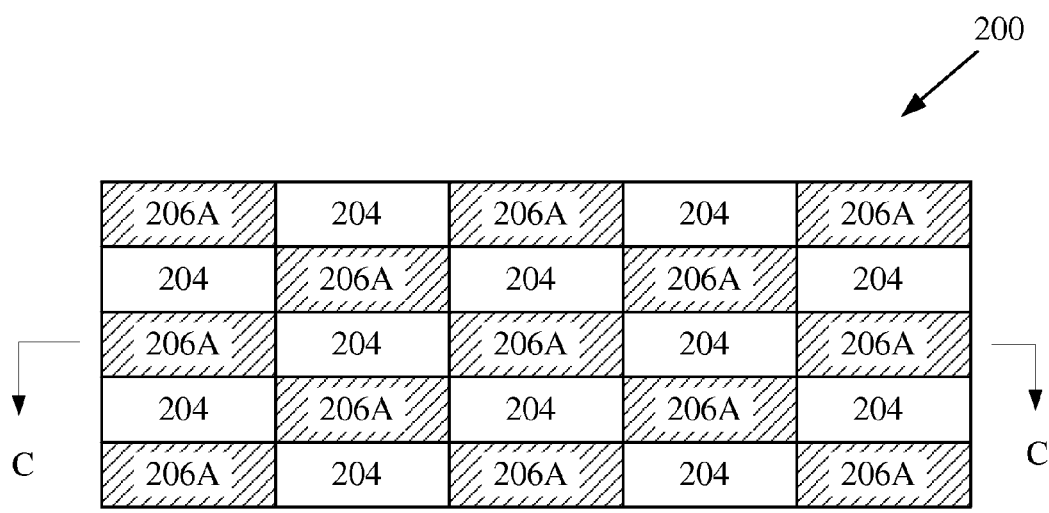

In other alternative embodiments, the Ch-LCP layer 206 includes discontinuities or islands, formed when uncured areas of the Ch-LCP layer 206 are removed or etched away using a solvent, as described below with reference to FIG. 4A. FIG. 2C illustrates an elevational section of an example configuration, and FIG. 2D illustrates a plan view. In this example, the Ch-LCP layer 206 is differentiated by microlithography into patterned regions 206A and unpatterned regions 206C. The unpatterned regions 206C are formed by removing non-polymerized matter using a solvent so that only the patterned regions 206A of the Ch-LCP layer 206 remain. During use of the resulting device, light is transmitted unmodified through the unpatterned regions 206C of the Ch-LCP layer 206.

Returning to FIG. 2A, the Ch-LCP layer 206 and the LPP layer 204 may be protected by a coating or barrier layer 207. The barrier layer 207 may provide several advantages, such as: (1) preventing or reducing diffusion of reactive gas or liquid onto the Ch-LCP and LPP layers 206, 204 to potentially increase the operating lifetime of the layers, (2) operating as an antireflection coating, (3) serving as a protective layer, and/or (4) serving as a planarization layer. Representative examples of the barrier layer 207 are silicon oxide, optical cement, sol gel, and polyimide. FIG. 2C is shown without a barrier layer. In an alternative embodiment, a barrier layer may be applied over a Ch-LCP layer having discontinuities or islands.

Figure 3A:
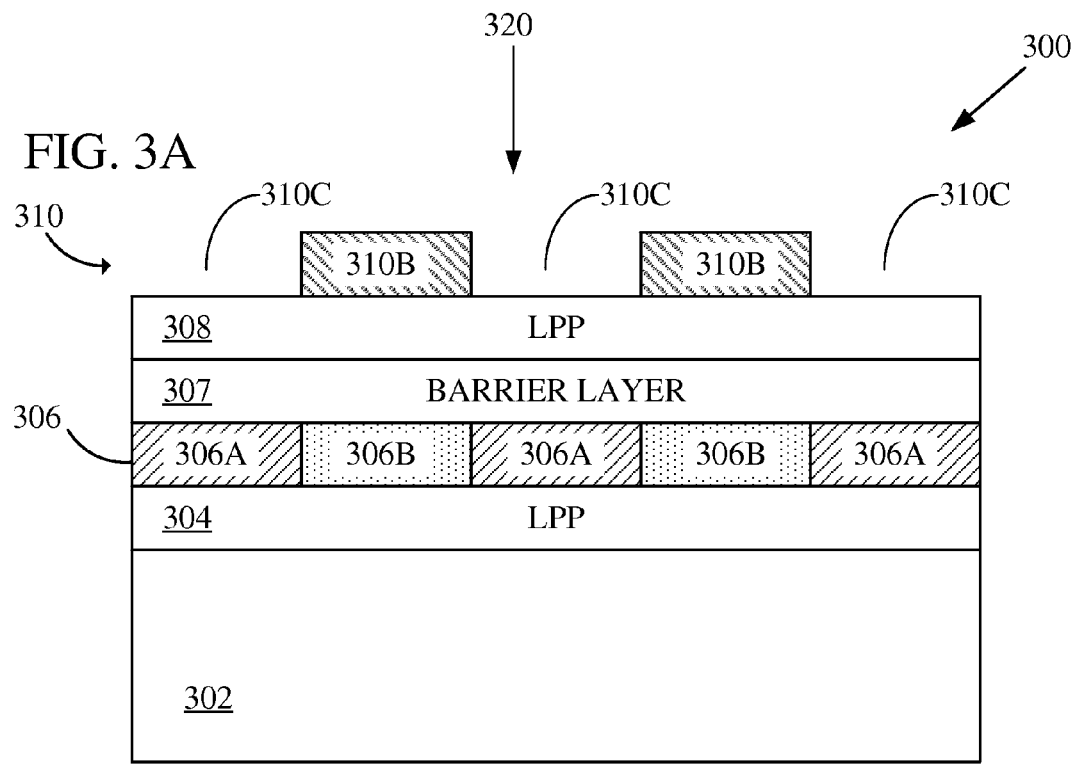
FIGS. 3A-3B illustrate a representative embodiment of a multilayer Ch-LCP device.

While many applications can be addressed with devices having a single Ch-LCP layer, additional Ch-LCP layers can be formed, with or without additional LPP alignment layers. Thus, Ch-LCP and LPP layers can be stacked on the substrate 202 to create multiple-layer and three-dimensional oriented structures. FIG. 3A illustrates a sectional view of a representative multilayer Ch-LCP device 300. A first LPP layer 304 is deposited on a substrate 302 to produce alignment in a first Ch-LCP layer 306 formed on the first LPP layer 304. The first Ch-LCP layer 306 includes patterned areas 306A and unpatterned areas 306B. By way of example, the patterned areas 306A are cured in a cholesteric phase such that the periodic helical structure of the liquid crystal molecules is maintained. The unpatterned areas 306B are cured in an isotropic state. A generally transparent barrier layer 307 is formed on the first Ch-LCP layer 306. A second LPP layer 308 is deposited on the barrier layer 307 to produce alignment in a second Ch-LCP layer 310 formed on the second LPP layer 308. The second Ch-LCP layer 310 includes patterned areas 310B and unpatterned areas 310C. In this embodiment, the unpatterned areas 310C are formed by dissolution of Ch-LCP molecules in the areas using a solvent. The second Ch-LCP layer 310 may have the same or different optical properties than the first Ch-LCP layer 306. For example, the first Ch-LCP layer 306 may be doped with a right-handed chiral dopant, and the second Ch-LCP layer 310 may be doped with a left-handed chiral dopant. The LPP layers 304, 308, the substrate 302, and the unpatterned area 306B may be selected so as to be generally optically transparent to incident electromagnetic radiation having wavelengths and/or polarizations of interest. In this manner, light incident to the device 300 from the direction 320 is transmitted through the device 300 according to the representative checkerboard pattern of FIG. 3B. Right-handed circularly polarized light incident on the areas 306A is reflected, while left-handed circularly polarized light incident on the areas 306A is transmitted. Left-handed circularly polarized light incident on the areas 310B is reflected, and right-handed circularly polarized light incident on the areas 310B is transmitted.

In a further alternative embodiment, the first Ch-LCP layer 306 is doped with a chiral dopant that transmits incident light centered at a first wavelength, while the second Ch-LCP layer 310 is doped with a chiral dopant that is transmissive to incident light centered at a second wavelength.

In further alternative embodiments, additional devices having Ch-LCP or LCP layers (and LPP layers) are provided. Furthermore, additional layers such as metallic, semiconductor, planarized, or barrier layers can be formed to separate Ch-LCP and/or LCP and/or LPP layers from each other in the thickness dimension. Further alternative embodiments can comprise a second substrate, wherein, if desired, an alignment layer such as an orientated LPP layer or a conventional rubbed polyimide layer is situated on the surface of the second substrate. The LPP layer can provide a uniform orientation for producing common alignments in subsequently formed Ch-LCP layers, or the LPP layer may be patterned to provide multiple alignments of the subsequently formed Ch-LCP layers. One or more of the LCP layers can include any of various guest materials such as fluorophores, carbon nanotubes, dichroic dyes, organic semiconductors, or other materials. Multiple LCP layers can include the same or different guest materials, or no guest material at all. Typically, the LPP and LCP layers exhibit birefringence and optical retardation in which spatially varying optical axes are formed without using a guest material in the LCP layer. Finally, a mixture of different types of LCP or Ch-LCP can be used as a single layer. For example, a Ch-LCP with positive dispersion can be combined with a Ch-LCP with negative dispersion to create a mixture with zero or fixed dispersion over a finite wavelength range. This type of device may have uses for broadband optical filters and for applications where the precise dispersion over a fixed wavelength range is important.

Representative Methods

Figure 4A:
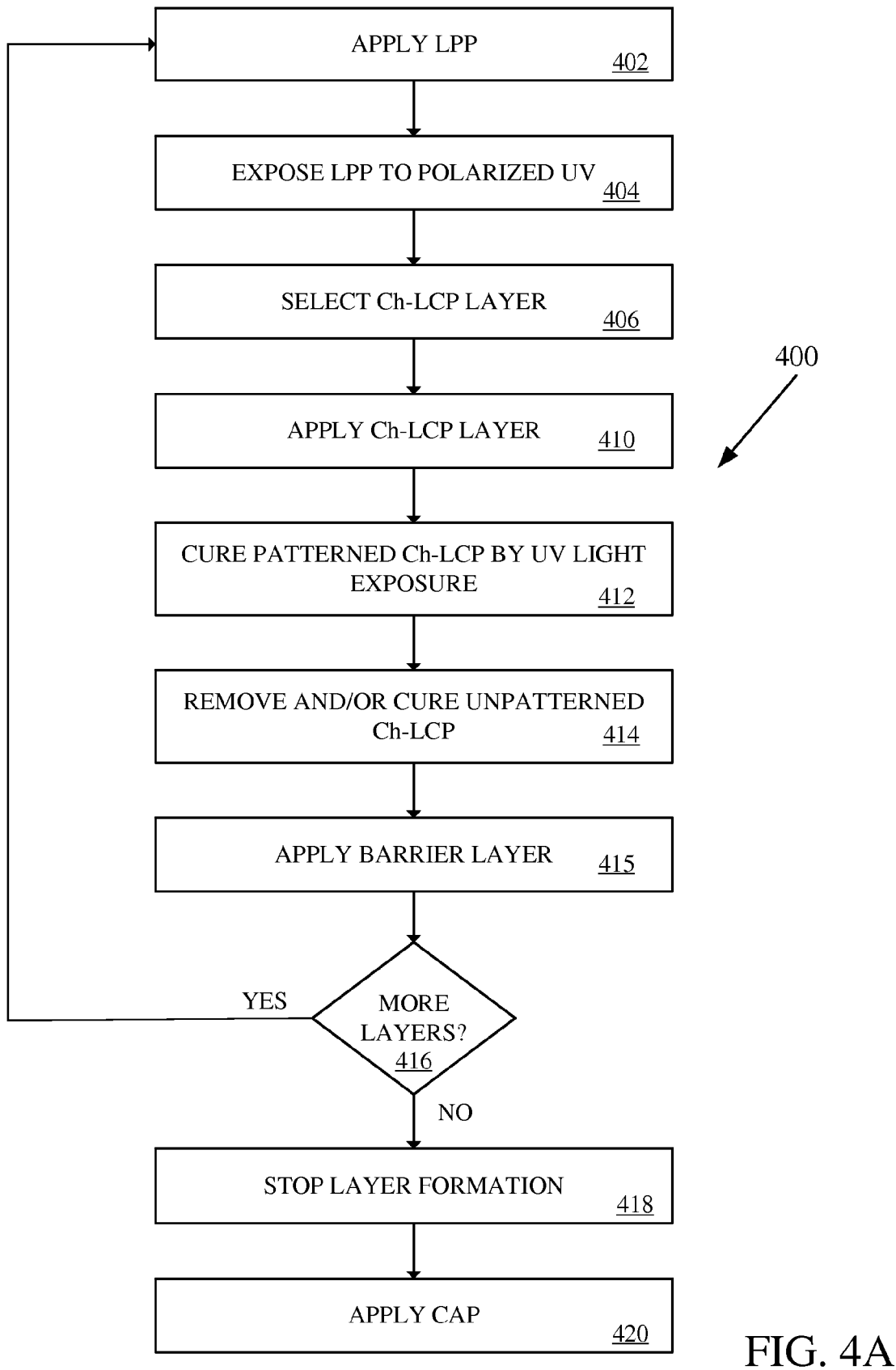
FIGS. 4A-4C illustrate a representative embodiment of a method for fabricating linear photo-polymerizable polymer (LPP)/Ch-LCP devices.

A representative embodiment of a fabrication method 400 is illustrated in FIG. 4A. At 402, an LPP layer is formed on a substrate by spin-coating or other suitable process. For a non-planar surface, a planarization layer may be applied first to planarize the substrate. Generally, spin-coating can be performed at any speed suitable for producing a relatively uniform thickness of LPP across the substrate. Spin-coating may be followed by a soft-bake to evaporate at least some of the solvent from the just-formed LPP layer and to make the coated substrate easier to handle. For example, in one embodiment, the LPP layer is dispensed onto the substrate, spin-coated at 2000 revolutions per minute (RPM) for 1 minute, and soft-baked at 95° C. for 2 minutes. In an alternative embodiment, the LPP layer is spin-coated at 2500 RPM rather than at 2000 RPM. The spin-coating speed will depend on a variety of factors, such as the method by which the LPP is applied to the substrate, the smoothness of the substrate, the diameter and thickness of the substrate, the viscosity of the LPP, and/or the temperature of the substrate and the LPP, for example.

At 404, at least a portion of the LPP layer is exposed to linearly polarized UV light to polymerize the LPP in the exposed portion. The linearly polarized light may be uniformly incident across the substrate, or the linearly polarized light may be patterned. For patterning, a patterned chrome-on-quartz mask may be placed between the LPP layer and a source of linearly polarized light. Transmission of the UV light through the mask patterns the light for incidence onto corresponding regions of the LPP layer. The mask can define a plurality of transmissive regions (e.g., apertures lacking a chrome coating). For example, in one embodiment, an ABM Mask Aligner is used to align the LPP layer(s). For aligning the LPP layer, a dichroic UV polarizer (e.g., manufactured by Boulder Vision Optics, Boulder, Colo., USA) can be used to produce the desired linearly polarized UV illumination. An example LPP layer is available from DIC Corporation, as product number DIC-LIA01.

At 406, a Ch-LCP material is selected so that, when applied to the LPP layer previously exposed to linearly polarized light, the optical properties of the Ch-LCP layer can be tuned, i.e., a Ch-LCP layer can be produced having one or more preselected optional properties. Selected "tuning" variables include, but are not limited to, concentration of chiral dopant in the Ch-LCP material, handedness of the chiral dopant, the particular LPP material used, the particular Ch-LCP material or materials used, the particulars of patterning, and the particulars of curing and/or solvent rinsing. In one embodiment, the LCP and chiral dopant are provided pre-mixed in a commercially available Ch-LCP material. For example, a premixed Ch-LCP powder is available from EMD Chemicals, as product number RMM1036. This particular Ch-LCP powder can be dissolved in $CHCl_3$ at up to a 30% weight-to-weight (w/w) ratio. The cholesteric phase of RMM1036 exhibits high reflectance at 535 nm, and the chiral dopant in RMM1036 is right-handed.

In an alternative embodiment, a nematic LCP material and a chiral dopant are mixed together at desired respective mixing ratios to form a desired Ch-LCP layer. The chiral dopant is usually an organic compound that introduces twisting in the nematic liquid crystal. For example, a Ch-LCP preparation containing a nematic LCP material is available as product number RMM141C from EMD Chemicals, and a chiral dopant, product number R811 is also available from EMD Chemicals. R811 is a right-handed chiral dopant. The LCP material is a powder that is soluble in chloroform ($CHCl_3$) at up to a 30% w/w ratio. Other solvents or solvent mixtures can alternatively be used.

Figure 4B:
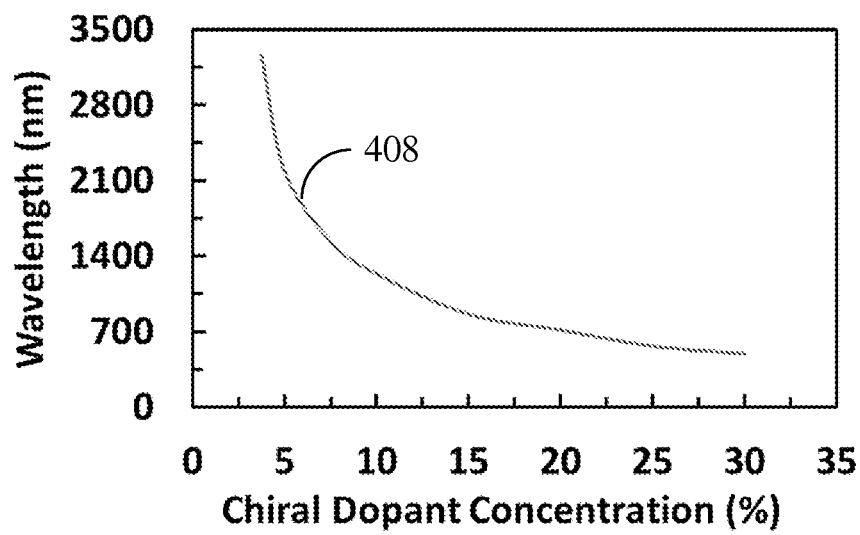
Figure 4C:
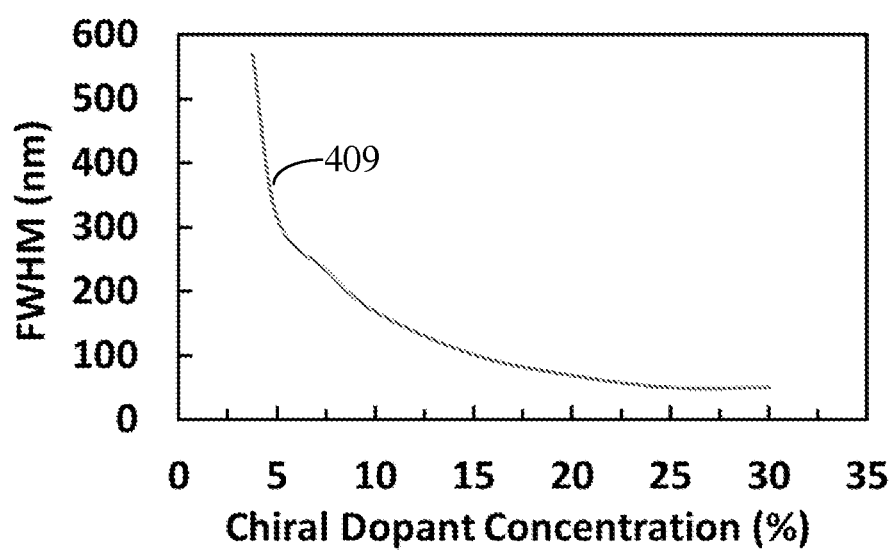

The chiral dopant concentration in the Ch-LCP layer (usually expressed as a percentage of the LCP material) may be varied to correspondingly vary the optical properties of the Ch-LCP layer. For example, FIG. 4B illustrates a relationship of the respective wavelengths of most-blocked light to the concentration of the chiral dopant in Ch-LCP layers of respective filters. The filters are defined by a respective central wavelength $\lambda_{filter}$ and a respective bandwidth $\Delta\lambda_{filter}$, where $\lambda_{filter}$ is the wavelength of the light most-blocked by the filter. $\Delta\lambda_{filter}$ is a measure of curve width of the respective spectrum of blocked light, such as full width at half maximum (FWHM) or ±1 standard deviation. Specifically, curve 408 shows the respective central wavelength most blocked (least transmitted) through a patterned area of Ch-LCP (model RMM141C over an aligned LPP layer of DIC-LIA01) for various chiral dopant (model R811) concentrations. For example, a chiral dopant concentration of 7.5% blocks the most light at about 1500 nm, and a chiral dopant concentration of 20% blocks the most light at about 720 nm. Curve 409 of FIG. 4C illustrates that curve width (e.g., FWHM) also varies with the chiral dopant concentration in the Ch-LCP layer. For example, a chiral dopant concentration of 7.5% produces a FWHM of about 250 nm, and a chiral dopant concentration of 20% produces a FWHM of about 70 nm.

Returning to FIG. 4A, at 410, the Ch-LCP layer is applied to the exposed (e.g., patterned) LPP layer. The manner of application may vary, depending on the particular Ch-LCP formulation selected in 406. For example, the RMM1036-type Ch-LCP layer may be applied by: (1) spin coating at 3000 RPM, (2) drying at 55° C. for two minutes to remove residual solvent, and (3) cooling at room temperature for ten minutes. As another example, the R811-type Ch-LCP layer may be applied by: (1) spin coating at 2000 RPM and (2) drying at room temperature for ten minutes to remove residual solvent. As the solvent evaporates, both types of Ch-LCPs become aligned with the LPP layer. The liquid crystal molecules in the Ch-LCP layer adjacent to and over an aligned region of the LPP layer are in the planar state of the cholesteric phase. The liquid crystal molecules in the Ch-LCP layer adjacent to and over an unaligned region of the LPP layer are in the focal conic state of the cholesteric phase.

At 412, the patterned areas of the Ch-LCP layer are cured by exposing them to unpolarized ultraviolet light. In one example, a Ch-LCP layer formed on a LPP-coated substrate and was masked according to a desired pattern and illuminated with unpolarized UV light at an intensity of 20 $mW/cm^2$ for one minute. An ABM Mask Aligner was used to pattern the Ch-LCP film. The patterned regions exposed through the photomask were polymerized (cross-linked) to affix the optical properties of the patterned regions and thus of the filter.

At 414, material in unpatterned areas of the Ch-LCP layer, which are not cured or not completely cured, is removed by solvent rinsing or further cured by thermal annealing. In this manner, the polymerized (patterned) regions are optically differentiated from the non-polymerized regions (non-patterned regions). Thermal annealing includes heating the filter at a temperature greater than the clear-point temperature of the particular Ch-LCP and then exposing the filter to broadband unpolarized ultraviolet light. For example, thermal annealing of a R811-type Ch-LCP layer includes heating at 65° C. for two minutes and then exposing to 50 mW/cm² broadband-unpolarized UV light for one minute. As another example, thermal annealing of a RMM1036-type Ch-LCP layer includes heating at 100° C. for two minutes and then exposing to 50 mW/cm² broadband-unpolarized UV light for one minute. By heating at a temperature higher than the clear-point of Ch-LCP, non-patterned regions of the Ch-LCP layer are transformed to an isotropic phase, while the earlier cured patterned regions remain unchanged in a planar or cholesteric state. Exposing the substrate to broadband unpolarized ultraviolet light cures the entire filter by polymerizing the Ch-LCP layer, resulting in a durable patterned thin-film filter.

Alternatively, unpatterned areas can be removed from the Ch-LCP layer by solvent rinsing. For example, a solvent rinse may include rinsing with a mixture of toluene/isopropyl alcohol (10/90 w/w) for one minute to remove non-polymerized material from unpatterned areas.

At 415, a barrier layer may be optionally applied over the thin-film filter. Representative examples of the barrier layer are silicon oxide, optical cement, sol gel, and polyimide. In one embodiment, the barrier layer may be applied by spin-coating and curing the barrier layer material. A barrier layer may also function as a planarization layer when applied over a Ch-LCP layer having discontinuities or islands, such as when unpatterned areas of the Ch-LCP layer are removed by solvent rinsing.

At 416, an evaluation is made of whether additional layers should be formed on the filter. Selection and formation of additional layers continues at 402. Additional layers of Ch-LCP and/or LPP can be applied in the same way as described above, but with different patterns, if desired. Similarly, additional layers of LPP and/or LCP of materials different from the respective initially-formed layer can be applied. For example, additional layers of the LCP formulation having different respective guest materials such as fluorophores, carbon nanotubes, dichroic dyes, organic semiconductors, or other materials, may be applied. If all desired layers have been formed on the filter, at 418, LPP/Ch-LCP layer formation stops.

At 420, a cap material such as silicon dioxide or calcium fluoride glass is applied so that the LPP and Ch-LCP layers are substantially sealed from the environment, except at layer edges. In an alternate embodiment, glass or fused silica is applied as a cap material, typically using an ultraviolet-curable optical adhesive. While LPP layers applied and cured as described above can provide a more reproducible, readily patterned LC alignment than conventional rubbed alignment layers (for example, rubbed polyimide layers), one or more rubbed layers can be used for achieving alignment, particularly if patterning of the alignment layer is not likely to be required.

Micropolarizer on a Sensor Array

Figures 5A, 5B:
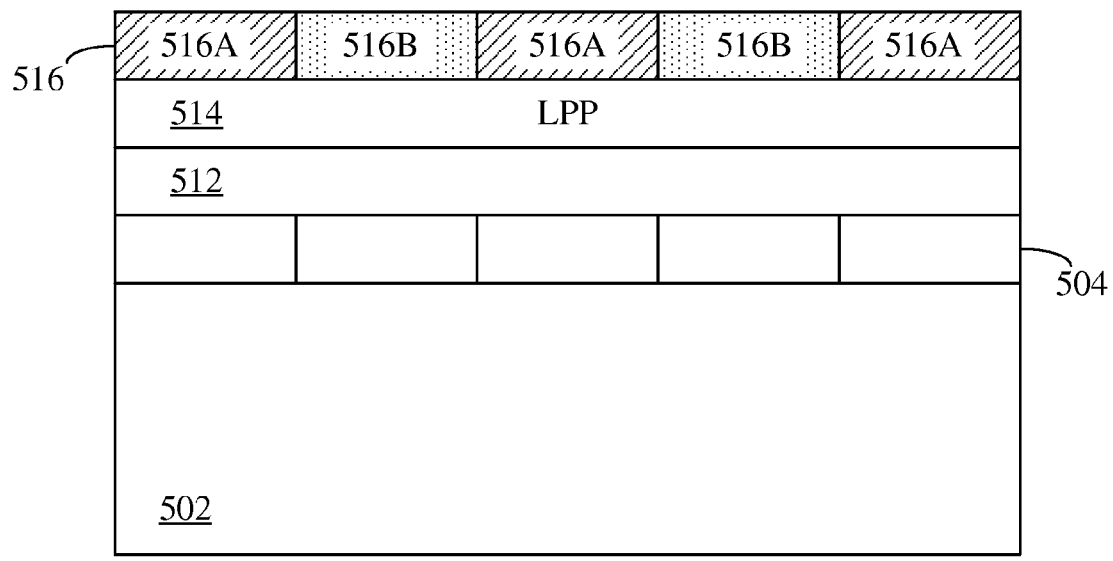
FIGS. 5A-5B are sectional and plan views, respectively, of a charge-coupled-device (CCD) image sensor comprising an embodiment of a patterned LPP/Ch-LCP polarizer.

A micropolarizer array can be fabricated directly on an imaging sensor, such as a charge-coupled-device (CCD) or complementary metal-oxide-semiconductor (CMOS) sensor, or a display-device, such as a liquid crystal display (LCD), organic light emitting diode (OLED) display, or plasma display. A representative embodiment of a micropolarizer device is illustrated in FIGS. 5A-5B, in which the CCD 502 includes an array 504 of pixels $504_{I,J}$, wherein I, J are integers that refer to a respective row and column number, respectively, associated with a selected pixel. For color image sensors, the pixels $504_{I,J}$ can include two or more color elements, and typically each of the pixels $504_{I,J}$ includes four color elements, at least one of which being associated with a red (R), green (G), or blue (B) color filter. As used herein, a pixel refers to either a collection of sensor elements arranged to produce a color representation at a selected image location, or a single sensor element that can be part of a collection of sensor elements. Image sensors and arrangements of color filters for such sensors are described in U.S. Pat. No. 3,971,065, U.S. Pat. No. 6,783,900, and Dillon et al., IEEE Trans. Electron Devices 25:97 (1978), all of which being incorporated herein by reference in their respective entireties.

The image sensor 502 can include a planar or other exterior surface including a passivation or protective coating 512. An example protective coating is a light-transmissive insulator such as BPSG, PSG, silicon dioxide, silicon nitride, polyimide, or other known suitable material. A LPP layer 514 is situated on the passivation layer 512. In one embodiment, the LPP layer 514 is aligned by exposure to a uniformly polarized UV beam. In an alternative embodiment, the LPP layer 514 is patterned by exposure to one or more polarized UV beams using one or more masks so as to define LPP orientation directions that can vary in any of various ways, including from pixel to pixel (including from color element to color element in a color-image sensor).

Figure 3B:
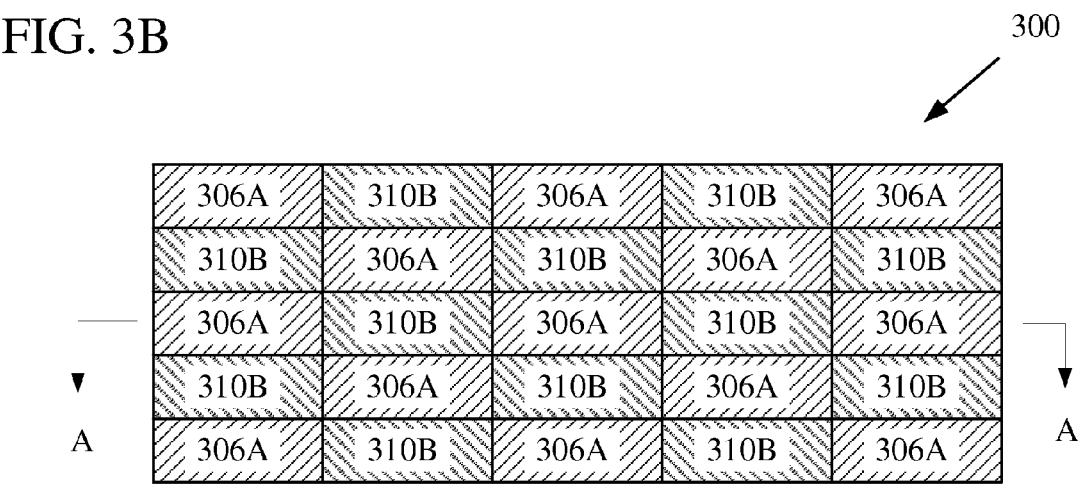

A Ch-LCP layer 516 is situated on the LPP layer 514. The Ch-LCP layer 516 includes patterned regions 516A and unpatterned regions 516B. In one embodiment, each pixel $514_{I,J}$ is associated with a respective patterned region 516A or unpatterned region 516B. For example, a pixel may be associated with a left circular polarizer formed by a patterned region, such as 516B, that is doped with a right-handed chiral dopant. One or more layer pairs of LPP/Ch-LCP are formed relative to the pixel array 504. If each Ch-LCP layer is formed having different respective optical properties from other Ch-LCP layers, each pixel may receive a different wavelength(s) or polarization(s) of light. For example, a checkerboard pattern, as shown in FIGS. 3A-3B, may be formed relative to a CCD so that one pixel receives left circularly polarized light and one or more adjacent pixels receive right circularly polarized light. Similarly, a checkerboard pattern of different LPP/Ch-LCP layers may be formed relative to a display so that, for example, one pixel transmits left circularly polarized light and adjacent pixels transmit right circularly polarized light. Finally, if desired, a protective layer can be formed on the array. It will be understood that a checkerboard pattern is exemplary only; the pattern may alternatively be any other ordered array or random array, or combination thereof.

In various alternative configurations, individual pixel-level polarizers can be conveniently fabricated on an image sensor, wherein the image-sensor pixels are associated with respective filter elements such as retarders or polarizers defined by respective patterned LPP/Ch-LCP or LPP/LCP layers. Pattern elements can be aligned based on lithographic mask alignments as the layers are defined on the sensor. Polarization extinction ratios of at least 2:1, 5:1, 10:1, 20:1, 50:1, or 100:1, for example, can be achieved for use in a wide range of applications. A representative device fabricated with multiple layers of LPP/Ch-LCP and/or LPP/LCP is described with reference to FIG. 6 below.

Optical sensors such as CCD and CMOS devices can be provided with arrays of patterned or unpatterned polarizers and/or retarders as described herein. Similarly, optical filters such as conventional thin-film or absorptive filters can be made that include one or more LPP/Ch-LCP layers or one or more LPP/LCP layers that can be used as polarizers (e.g., linear, circular, or elliptical polarizers), filters, or retarders of arbitrary retardation such as quarter-wave or half-wave retarders. The LPP/Ch-LCP and LPP/LCP layers can be patterned or unpatterned, and multilayer structures can include different patterns on some or all layers thereof. Representative applications include three-dimensional displays, interferometry, optical storage, polarimeters, and polarization-sensitive cameras.

Devices comprising one or more LPP/Ch-LCP layers can be formed directly on semiconductor substrates (e.g., semiconductor wafers) having other devices defined thereon, or directly on pre-fabricated devices such as image sensors or displays. Other electronic devices to which LPP/Ch-LCP devices can be applied include, but are not limited to, CMOS devices, photomultipliers, avalanche photodiodes, microelectromechanical systems, microbolometers, and superconducting devices. In some examples, LPP/Ch-LCP devices are formed on transparent substrates and then mounted to a wafer, optical element, or other substrate. Barrier and planarization layers can be provided at LPP or Ch-LCP layers, and the substrates can be planar, non-planar, rigid, or flexible. The disclosed devices can have flexible LPP and/or Ch-LCP layers. These layers can be applied so as to conform to planar or complex three-dimensional shapes.

Near-Infrared Image Polarimeter

Multiple layer pairs of LPP/LCP and/or LPP/Ch-LCP can be applied successively to substrates to create a variety of optical elements such as color filters and elliptical or circular polarizers. One or more of the successive LCP layers can include respective other materials in addition to the liquid crystal polymer, such as dichroic dyes, fluorescent dyes, or carbon nanotubes. The successive Ch-LCP layers can include different respective concentrations of chiral dopants or chiral dopants of different handedness.

Figure 6:
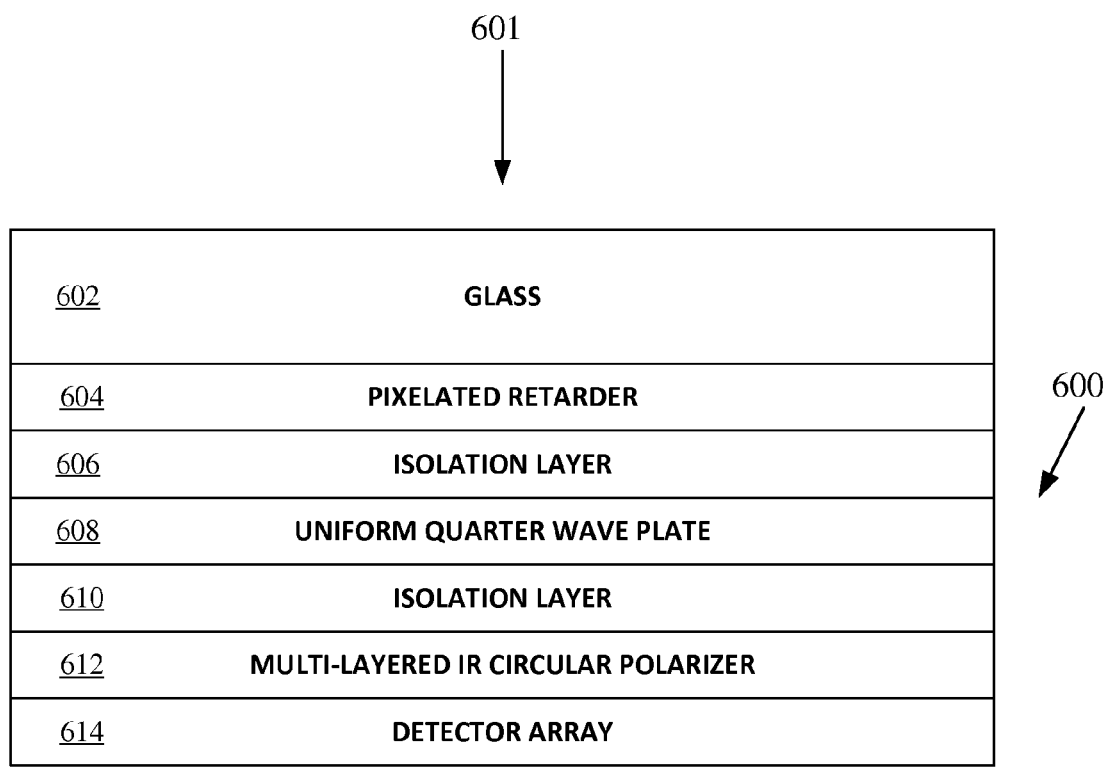
FIG. 6 illustrates a representative near-infrared imaging polarimeter fabricated with multiple layers of LPP/LCP and/or LPP/Ch-LCP.

An example of a multi-layer device is a near-infrared polarimeter 600 illustrated in FIG. 6. The polarimeter 600 is oriented so that incidental light 601 enters through a glass layer 602. In one embodiment, the glass layer 602 is used as a substrate on which the additional layers of the polarimeter 600 are formed. In an alternate embodiment, a detector array 614 is used as a substrate on which the additional layers of the polarimeter 600 are formed.

A pixelated retarder 604 is formed on the glass layer 602. The pixelated retarder 604 includes an LPP layer including multiple orientation directions and a LCP layer. For example, the LPP layer may be divided into four quadrants, wherein each quadrant has a different orientation direction established by single or multiple exposure to polarized ultraviolet radiation. The LPP layer is coated with a layer of LCP material that becomes aligned with the LPP layer.

In some applications, the multilayer device can include a so-called "pixelated phase mask" comprising a patterned polarizer or retarder comprising one or more respective LPP/LCP layer pairs. This device can be used for spatial phase multiplexing in interferometry. A multilayer or single layer patterned retarder can have pattern elements providing equal or varying retardation and with similar or variable alignment. A patterned polarizer can have a regular or other predetermined arrangement of polarizer elements so that orthogonal test and reference wavefronts incident to the patterned polarizer produce an interference pattern that is detectable by an array detector. Typically, the pitch of the patterned polarizer/retarder pattern is the same as or is an integer multiple of the pixel pitch of the array detector. Uses of such pixelated phase masks are described in Brock et al., U.S. Pat. No. 7,230,717, which is incorporated herein by reference in its entirety. In some examples, a pixelated phase mask includes a quarter-wave retarder and one or more polarizing elements, or other combinations of polarizing elements and retarder elements. The elements are typically selected to produce interference between incident orthogonally polarized test and reference wavefronts.

In this embodiment, a first isolation layer 606 is formed on the pixelated retarder 604. The first isolation layer 606 acts as a barrier or seal between the optically-active layer above and the optically-active layer below. The first isolation layer 606 may further act as a buffer so that the molecular alignment on one side of the isolation layer 606 is independent of the molecular alignment on the other side of the isolation layer 606. The first isolation layer 606 can be, for example, a cap made of glass or fused silica may be applied, e.g., using an ultraviolet-curable optical adhesive. Alternatively, a thin film that is optically transmissive at the wavelength and polarization of interest may be formed over the pixelated retarder 604.

A uniform quarter-wave plate 608 is formed on the isolation layer 606. The uniform quarter-wave plate 608 in this embodiment includes an LPP layer with a uniform alignment and a LCP layer. The LCP layer is formed having a quarter-wave optical thickness appropriate for the wavelength of interest. Some oriented LPP layers provide considerable birefringence, and the LCP layer can be selected with due consideration of the retardation provided by the LCP layer. A second isolation layer 610, as described above, may be formed over the uniform quarter-wave plate 608.

A multilayered infrared (IR) circular polarizer 612 in this embodiment is formed over the second isolation layer 610. Infrared light extends beyond red light in the visible spectrum, and has wavelengths generally between 700 nm and 1 mm. The multilayered IR circular polarizer 612 may include a uniform LPP layer and a uniform Ch-LCP layer. The concentration of chiral dopant can be selected for a targeted frequency within the infrared band of the electromagnetic spectrum. In one example, the Ch-LCP layer is RMM141C-type, the chiral dopant is R811-type, and the chiral dopant concentration is less than 20% w/w. The handedness of the chiral dopant can be selected to form a left-circular polarizer or a right-circular polarizer.

In the embodiment of FIG. 6, the multilayer structure (pixelated retarder 604/quarter-wave plate 608/IR circular polarizer 612) forms a filter of a near-infrared image polarimeter 600. The combination of the filter and the detector array 614 form the near-infrared image polarimeter 600. The detector array 614 includes detectors (not shown) that are associated with and substantially aligned with pixels of the pixelated retarder 604. In other words, a quadrant of the pixelated retarder 604 should substantially overlap a detector of the detector array 614.

Example 1: Transmission Spectra of Sample Devices

Three sample devices have been fabricated and examined to investigate characteristics of devices fabricated in accordance with the techniques described herein. One of these sample devices was fabricated using R811-type Ch-LCP and including thermal annealing (labeled "R811 Thermal"). Another of these sample devices was fabricated using RMM1036-type Ch-LCP and including thermal annealing (labeled "RMM1036 Thermal"). A third sample device was fabricated using RMM1036-type Ch-LCP and including a solvent rinse (labeled "RMM1036 Solvent"). In some cases, it is desirable to measure the transmission spectrum of an optical element, for example, as a function of the wavelength of incident light. The three sample devices fabricated in accordance with the techniques described herein were evaluated using a Varian 5000 UV-VIS-NIR Spectrophotometer.

FIGS. 7A-7E show transmission spectra and images of the sample devices. FIGS. 7A and 7B show the transmission spectra of patterned and non-patterned regions, respectively. FIGS. 7C, 7D, and 7E are exemplary images of the R811 Thermal, RMM1036 Thermal, and RMM1036 Solvent sample devices, respectively (scale is provided in, e.g., FIG. 8C). The left-hand images in FIGS. 7C, 7D, and 7E (having a relatively light background) were obtained with the respective sample device being positioned between parallel linear polarizers. The right-hand images in FIGS. 7C, 7D, and 7E (having a relatively dark background) were obtained with the respective sample device being positioned between crossed linear polarizers.

R811-type Ch-LCP and RMM1036-type Ch-LCP are right-handed chiral materials, and thus act as left circular polarizers, i.e., left-handed circularly polarized light is transmitted through the Ch-LCP film and right-handed circularly polarized light is reflected from the Ch-LCP film, based on the periodic helical structure of the cholesteric phase. The theoretical designed wavelengths (described more fully below) of the sample devices are 550 nm for the R811-type Ch-LCP and 535 nm for the RMM1036-type Ch-LCP. FIG. 7A shows the minimum transmittances occurring near these designed wavelengths of the materials: specifically, at the wavelengths 556 nm, 530 nm, and 531 nm for the R811 Thermal, RMM1036 Thermal, and RMM1036 Solvent sample devices, respectively. Moreover, the spectra are distinct for different patterning methods, with the transmission spectrum of the RMM1036 Solvent sample device being wider than that of the RMM1036 Thermal sample device. This wider spectrum may be a result of solvent action (e.g., via intercalation) on the surfaces of the RMM1036 Solvent sample device. This solvent action can lead to imperfections in the sample device such as increased variation of the cholesteric pitch and in increased variation of the angle between incident light and the ordered molecular layers in the cholesteric phase.

FIG. 7B shows no significant variation in transmittance exhibited by the sample devices, as the non-patterned regions behave like an isotropic film with approximately 20% absorption. In contrast to the curve for the solvent-rinse sample device shown in FIG. 7B, ripples caused by thin-film interference are observed in the transmittance curves for both thermal-annealing sample devices in FIG. 7B. For the left-hand images of FIGS. 7C-7E, the corresponding spectra of the sample devices shown are illustrated in FIG. 7A. Similarly, for the right-hand images of FIGS. 7C-7E, the corresponding spectra of the sample devices are the complementary spectra shown in FIG. 7A.

Example 2: Polarization Properties

Polarization properties of optical elements can be characterized in terms of a set of numerical values often presented in the form of a Mueller matrix having the form:

$$M = \begin{pmatrix} M_{0,0} & M_{0,1} & M_{0,2} & M_{0,3} \\ M_{1,0} & M_{1,1} & M_{1,2} & M_{1,3} \\ M_{2,0} & M_{2,1} & M_{2,2} & M_{2,3} \\ M_{3,0} & M_{3,1} & M_{3,2} & M_{3,3} \end{pmatrix} \quad (1)$$

Exemplary devices fabricated as described herein were investigated using a Mueller matrix imaging polarimeter having a spatial resolution of 1 µm and a calibrated accuracy of 99%. From the measured Mueller matrices, various optical properties (e.g., polarization properties) of the investigated devices, including the depolarization index (DI), circular diattenuation (CD), and circular retardance (CR) were calculated and are presented and discussed below.

The depolarization index (DI) of an optical element, as that term is understood in the art, quantifies the reduction of the degree of polarization of light caused by interaction of the light with the optical element. A large DI indicates that light transmitted by the optical element has a lower degree of polarization than incident light (i.e., the light is depolarized slightly). In the devices discussed herein, depolarization can arise from imperfections in the devices, including the angular spread of the ordered molecular layers, imperfections in the planar phase, and finite wavelength bandwidths of the measurements. DI can be computed from a measured Mueller matrix using the relationship:

$$DI(M) = \frac{\sqrt{\left(\sum_{i,j} M_{i,j}^2\right) - M_{0,0}^2}}{\sqrt{3}\, M_{0,0}} \quad (2)$$

The circular diattenuation (CD) of an optical element, as that term is understood in the art, quantifies the transmittance of light through the optical element as a function of the circular-polarization state of the incident light. In general, the larger the CD, the more circularly polarized the light exiting the optical element. In the devices described herein, the CD depends on the concentration of Ch-LCP in the solvent during fabrication; the CD increases with corresponding increases in the thickness of the optical element. CD can be computed from a measured Mueller matrix using the relationship:

$$CD(M) = \frac{M_{0,3}}{M_{0,0}} \quad (3)$$

In the sample devices described herein, CD was maximal at the designed wavelength λ of the Ch-LCP, wherein λ can be calculated from the refractive index n and the pitch length P (which is itself a function of the helical twisting power (HTP) and the concentration (x) of the chiral dopant) of the Ch-LCP using the relationships:

$$\lambda = n \times P = \frac{n}{HTP \times x} \quad (4)$$

The circular retardance (CR) of an optical element, as that term is understood in the art, is a quantification of the phase shift in right and left circularly polarized light passing through the optical element. In the devices described herein, the CR is linearly proportional to the thickness of the optical element. CR can be computed by decomposing a measured Mueller matrix into a diattenuator Mueller matrix, a retarder Mueller matrix, and a depolarizer Mueller matrix using Lu-Chipman decomposition (a computational method in which a Mueller matrix is separated into other matrices), and then computing the CR from the retarder Mueller matrix (which defines the retardance properties of the optical element and provides a method of calculating the CR).

DI, CD, and CR were measured for the three sample devices, and the results are summarized in FIGS. 8A-8I. The results show that the polarization properties are different between patterned regions and non-patterned regions of the devices. Specifically, the patterned regions generally behaved as circular polarizers or circular retarders, and the non-patterned regions generally did not. FIGS. 8A-8C show polarization properties of the R811 Thermal device measured at 550 nm wavelength, FIGS. 8D-8F show polarization properties of the RMM1036 Thermal device measured at 535 nm wavelength, and FIGS. 8G-8I show polarization properties of the RMM1036 Solvent device measured at 535 nm wavelength.

Optical properties were determined for the 2.23 mm$^2$ square area at the bottom of each image in FIGS. 8A-8I. The average magnitudes of CD were determined to be −0.65±0.01, −0.78±0.02, and −0.81±0.02 for the R811 Thermal (FIG. 8A), RMM1036 Thermal (FIG. 8D), and RMM1036 Solvent (FIG. 8G) devices, respectively. The average magnitudes of CR were determined to be 20.2±2.5°, 14.9±3.7°, and −15.5±5.3° for the R811 Thermal (FIG. 8B), RMM1036 Thermal (FIG. 8E), and RMM1036 Solvent (FIG. 8H) devices, respectively. The error over the measured area was determined to be one standard deviation of the measurement results, which was consistent with the accuracy (99%) of the polarimeter used. Imperfections in the alignment of the Ch-LCPs resulted in nonzero DIs. Specifically, the DI of the R811 sample device (FIG. 8C) was less than 0.1, and the DIs of the RMM1036 sample devices (FIGS. 8F and 8I) were less than 0.15.

The RMM1036 Solvent sample device had a higher DI (FIG. 8I) than the RMM1036 Thermal sample device (FIG. 8F). This difference is attributable to a consequence of solvent action on the film surface, which can result in imperfect planar phases and angular spread of the ordered Ch-LCP molecular layers. Specifically, optical scattering from Ch-LCP in the RMM1036 Solvent sample device (FIG. 8I) increased the DI by about 0.02 over that for the RMM1036 Thermal sample device. Moreover, since CR is linearly proportional to the thickness of the film, exposure to solvent on the surfaces of the RMM1036 Solvent sample device (FIG. 8H) resulted in a decrease of film thickness and thus a decreased CR, compared to the RMM1036 Thermal sample device (FIG. 8E). CD magnitude appears to depend on the concentration of Ch-LCP in the solvent during fabrication of the devices. Thus, although the thicknesses of the Thermal and Solvent sample devices were different, the CD magnitudes were found to be roughly the same (FIGS. 8D and 8G, respectively).

Figure 9A:
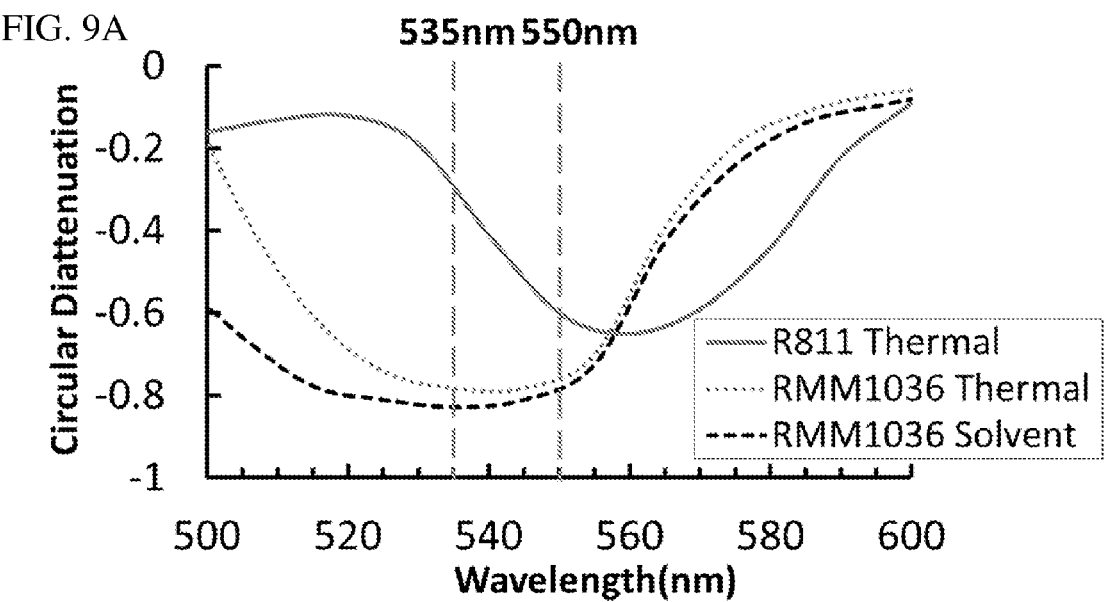
FIGS. 9A-9B shows CD and CR measured as functions of the wavelength of light incident on sample devices.
Figure 9B:
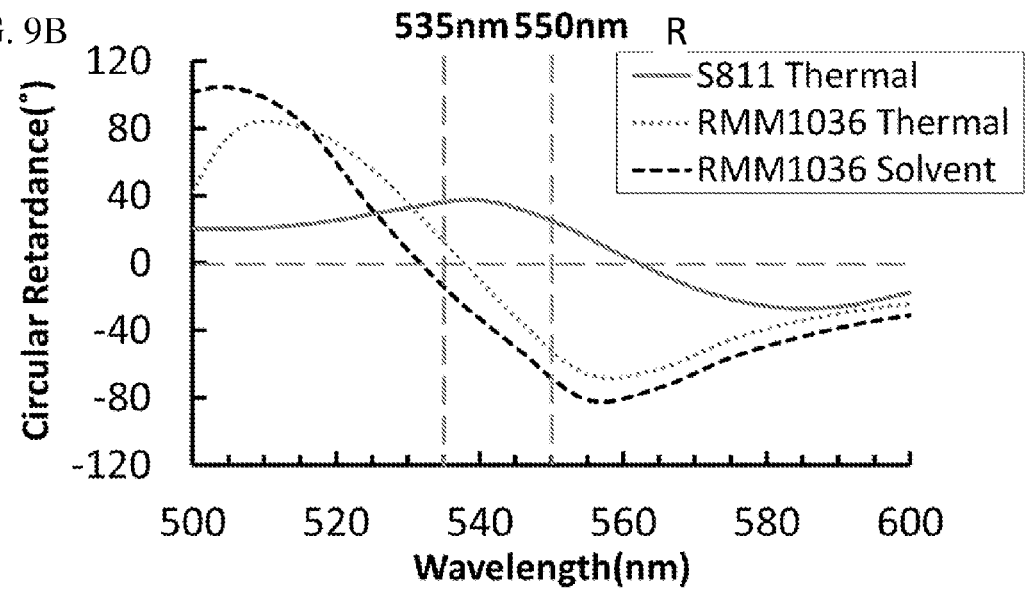

FIGS. 9A and 9B show CD and CR, respectively, measured as functions of the wavelength of light incident on the sample devices. In FIG. 9A, the minimum CD (the most negative value thereof) occurred at the designed wavelength of the sample device (535 nm), as was shown for the transmission spectra (FIG. 7A). Moreover, the shapes of the CD curves (FIG. 9A) were similar to the curves for the measured transmission spectra (FIG. 7A). The wider curve exhibited by the RMM1036 Solvent sample device (FIG. 9A) was attributed to increasing variation of the cholesteric pitch as well as the increasing variation of the angle between incident light and the ordered molecular layers in the cholesteric phase due to solvent action. CR (FIG. 9B) depends at least in part on the rotatory power of Ch-LCPs, which can change sign across the designed wavelength. The dispersion relation can be represented by the de Vries equation (a computational approach to the behavior of various systems, such as a system in which a solute is dissolving into a solvent) and is consistent with the curves shown in FIG. 9B. The dispersion curves of FIG. 9B show that the rotatory power of the R811 sample device changes sign at around 555 nm while the rotatory powers of the RMM1036 sample devices change sign at around 535 nm. Since the dispersion relation depends on the pitch of the helical structure and refractive indices of liquid crystal in both extraordinary and ordinary directions, different Ch-LCP sample devices (i.e., those fabricated using R811 and RMM1036) can result in different rotatory powers and dispersion curves.

In comparing the dispersion curves (FIG. 9B) of the RMM1036 Thermal and Solvent sample devices, a decrease in device thickness (and thus in CR) exhibited by the RMM1036 Solvent sample device, caused by exposure to solvent, produced an offset between the two dispersion curves. At 535 nm, CR of the RMM1036 Thermal sample device was 14.9° while CR of the RMM1036 Solvent sample device was −15.5°.

Example 3: Spatial Resolution

Figure 10A:
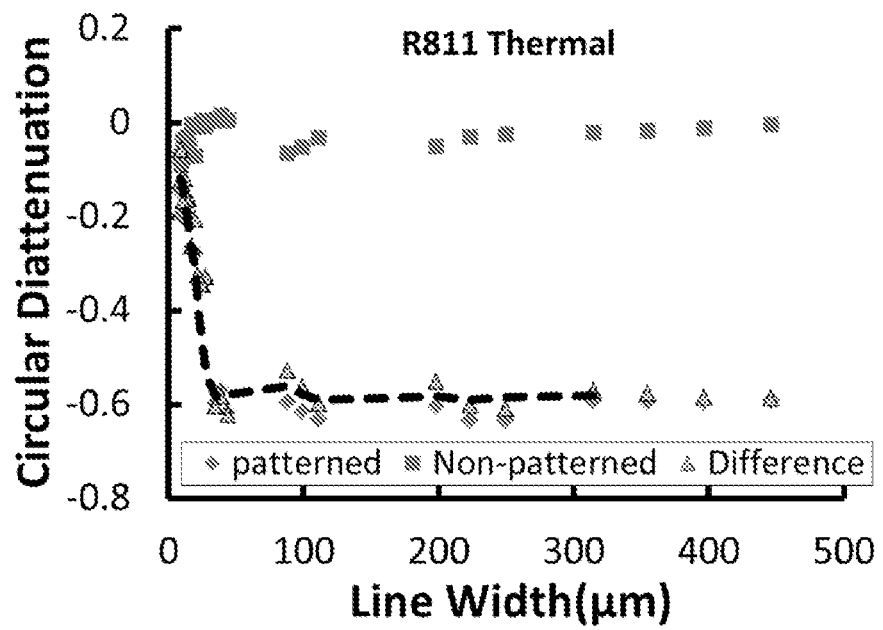
FIGS. 10A-10C shows CD magnitudes for lines of various widths formed in sample devices.
Figure 10B:
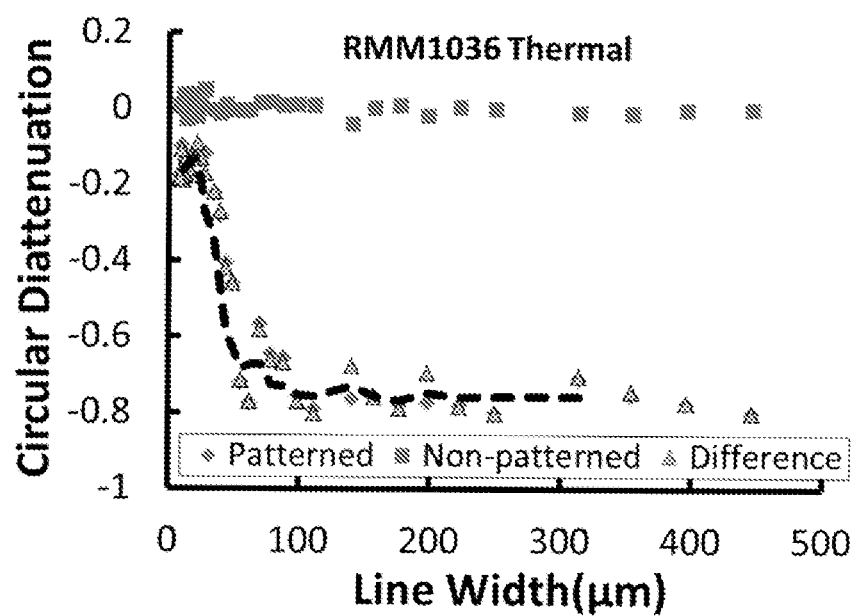
Figure 10C:
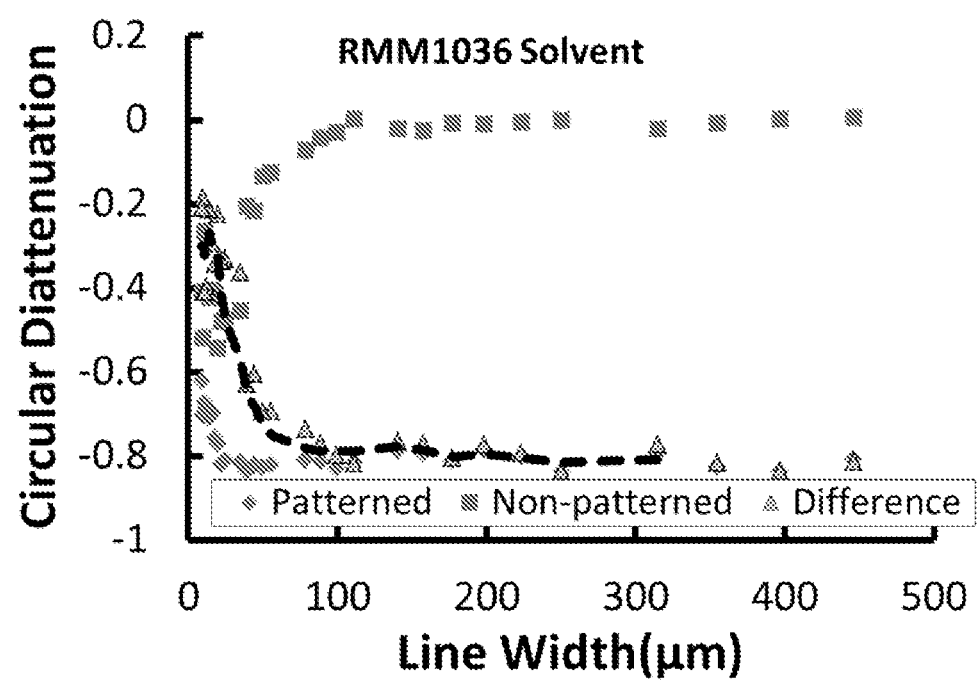

The spatial resolution of the sample devices was analyzed by comparing the magnitudes of the CDs of patterned regions with CDs of non-patterned regions. FIGS. 10A, 10B, and 10C show, for R811 Thermal, RMM1036 Thermal, and RMM1036 Solvent devices, respectively, CDs for lines of various widths formed in the respective sample devices. Each of FIGS. 10A, 10B, and 10C shows, for the respective sample device, three curves: CD values (—♦—) measured in the patterned regions (i.e., the lines), CD values (—■—) measured in the non-patterned regions, and the difference between the two (—▲—, and represented by the dashed lines). In each figure, the curve (—▲—) representing the difference between the other two was derived using a moving average algorithm.

As shown in FIGS. 10A-10C, for relatively narrow lines (about 50 μm or less), there were relatively small differences in CD measurements between patterned and non-patterned regions, indicating that lines having these relatively small widths were not well defined (i.e., well-formed). As the line widths increased, the difference in CD measurements between patterned and non-patterned regions increased until the difference reached a relatively steady-state value. For the R811 Thermal sample device, this steady-state value was −0.65±0.01. For the RMM1036 Thermal sample device, this steady-state value was −12.78±0.02. For the RMM1036 Solvent sample device, this steady-state value was −0.81±0.02.

The resolution of these sample devices, that is, the smallest useful feature size that can be formed in these sample devices, can be evaluated with reference to the data presented in FIGS. 10A-10C. In some cases, the resolution can be arbitrarily defined as the width of the narrowest line for which the difference in CD, measured in the patterned and non-patterned regions, is half the associated steady-state value, i.e., −0.325, −0.39, and −0.405, for the three sample devices, respectively. Alternative definitions of resolution can be used instead. Based on these data, the resolution of the sample devices was found to be 19.7 μm for the R811 Thermal sample device, 34.7 μm for the RMM1036 Thermal sample device, and 22.1 μm for the RMM1036 Solvent sample device.

The spatial resolution of the RMM1036 Solvent sample device was limited by accumulations of material caused by mass-transport effects during fabrication. The spatial resolution of the other two sample devices (R811 Thermal and RMM1036 Thermal) was apparently influenced by material diffusion, the finite length of transition between Ch-LCP phases, and the amount of UV patterning exposure.

Table 1 summarizes results discussed above.

| Sample Device | Designed Wavelength | DI | CD | CR | Resolution |
|---|---|---|---|---|---|
| R811 Thermal | 550 nm | 0.05 ± 0.01 | −0.65 ± 0.01 | 20.2° | 19.7 μm |
| RMM1036 Thermal | 535 nm | 0.13 ± 0.01 | −0.78 ± 0.02 | 14.9° | 34.7 μm |
| RMM1036 Solvent | 535 nm | 0.15 ± 0.01 | −0.81 ± 0.02 | −15.5° | 22.1 μm |

Example 4: Surface Profiles

Figure 11:
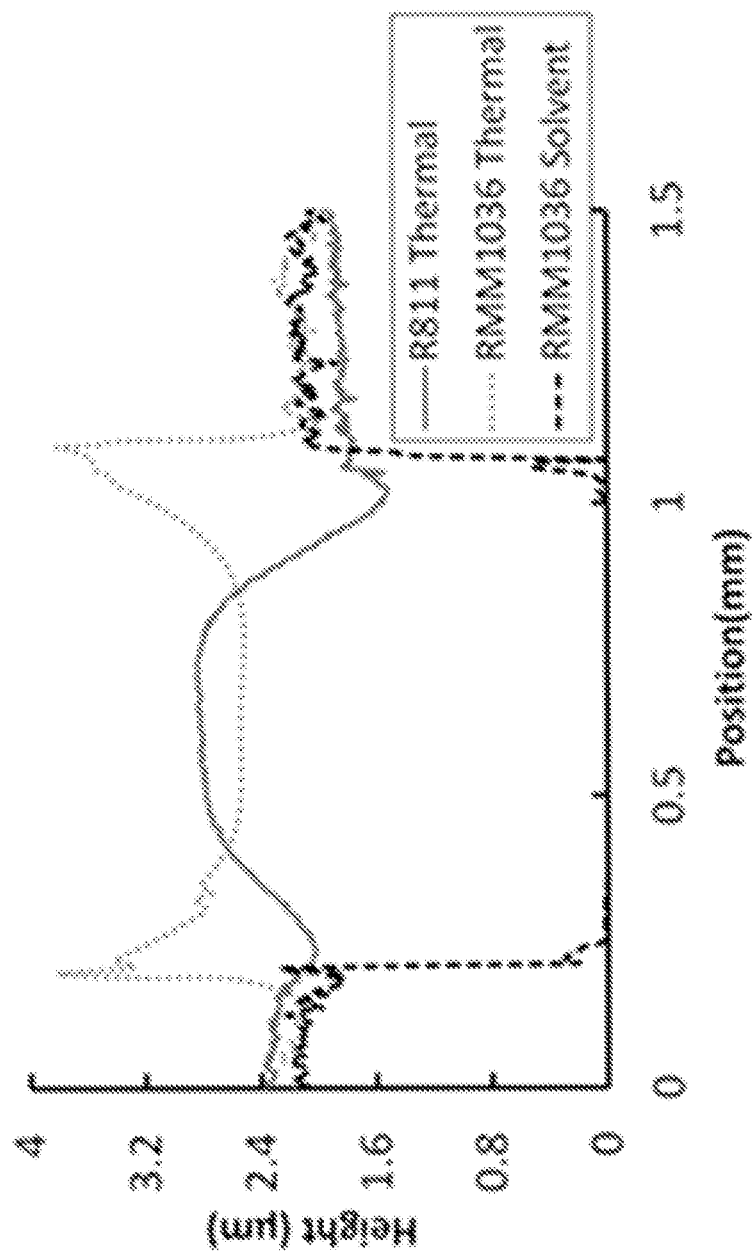
FIG. 11 shows surface profiles of sample devices.

FIG. 11 shows exemplary surface profiles of the R811 Thermal, RMM1036 Thermal, and RMM1036 Solvent sample devices measured using a Veeco Wyko NT9800 white-light interferometer. The surface profiles were centered on non-patterned regions having similar widths. As shown in FIG. 11, the height of various features was about 2 μm. The profiles of the patterned regions were relatively flat, and the profiles of non-patterned regions varied between sample devices. The width of the non-patterned region of the RMM1036 Solvent sample device was 0.92 mm. The nominal width of the corresponding feature of the mask used was 0.89 mm.

For sample devices fabricated using thermal annealing techniques, the surface profile of the non-patterned regions was influenced by mass-transport effects caused by the different diffusion rates between reactive mesogen monomers and polymers, which can lead to accumulation of material at the edges or the centers of non-patterned regions. More specifically, non-polymerized RMM1036-type Ch-LCP accumulated at edges while non-polymerized R811-type Ch-LCP accumulated at the center of the non-patterned regions. Improved formulations using different photo-initiators and/or alignment additives may help reduce accumulated material and flatten the surface profiles of the devices. In the RMM1036 Solvent sample device, non-polymerized material can be washed away using solvent during fabrication, possibly improving the surface profiles of the devices.

Example 5: Surface Morphologies

Figure 12:
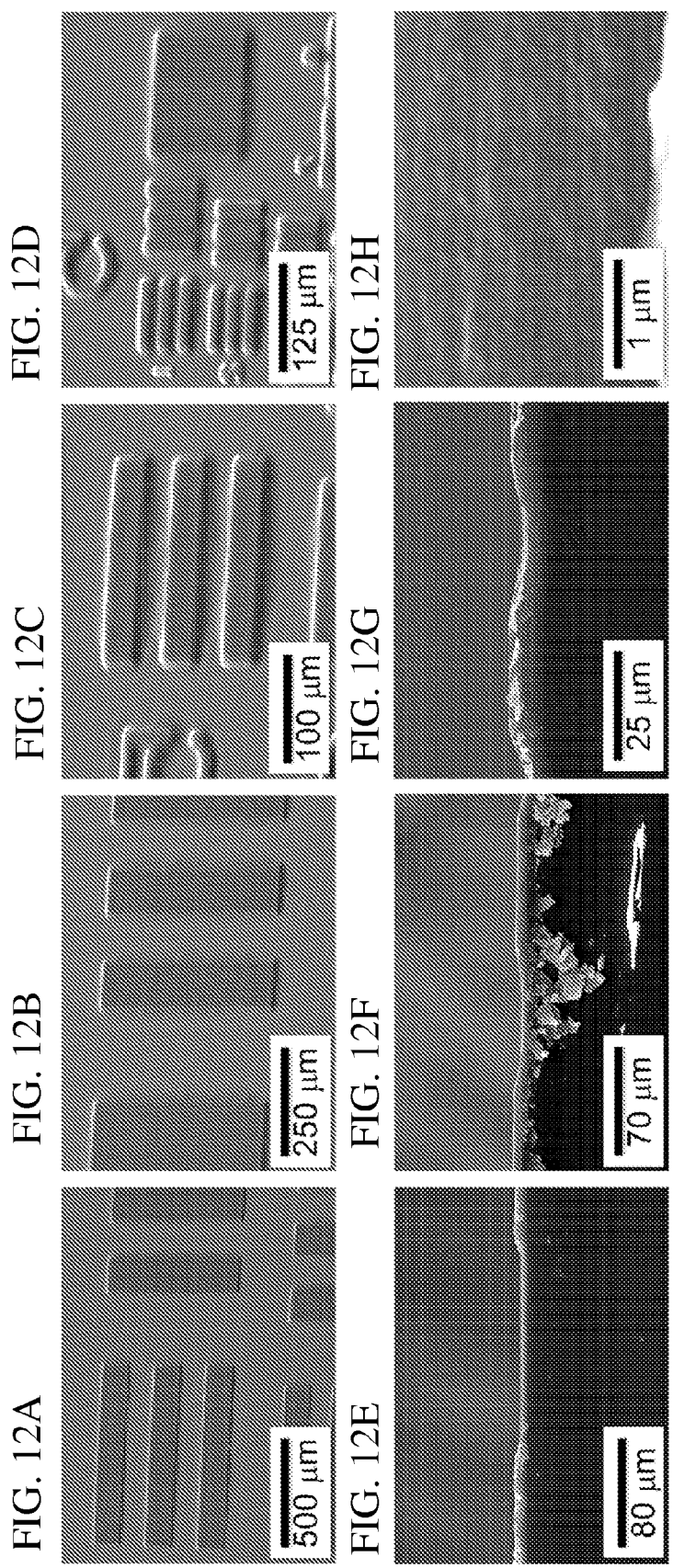
FIGS. 12A-12H shows scanning electron microscopy (SEM) images of a sample device.

Surface morphologies of exemplary devices fabricated in accordance with the techniques described herein can be investigated using various commercially available techniques such as scanning electron microscopy (for example, the Inspec-S SEM manufactured by FEI). FIG. 12 shows several scanning electron microscopy (SEM) images of the RMM1036 Solvent sample device. FIGS. 12A-12D are SEM morphological images, obtained at a tilt angle of 45°, of lines having widths of 176.7 μm, 111.4 μm, 39.4 μm, and 15.6 μm, respectively, formed on the surface of the sample device. FIGS. 12E-12G are cross-sectional SEM images of lines having widths of 157.7 μm, 88.3 μm, and 31.3 μm, respectively.

The results shown in FIGS. 12A-12G further support the measured values from light interferometric and imaging polarimeter analysis. As shown in FIGS. 12A, 12B, and 12E, well-defined structures were formed with trace amounts of residual material for features greater than 100 μm. The amount of residual material remaining between lines increased with decreasing line width, as shown in FIGS. 12C, 12D, 12F, and 12G. This residual material limited the spatial resolution of the sample devices.

FIG. 12H is a cross-sectional view of multiple periodic structural layers of Ch-LCP, illustrating the general uniformity of the layers. The half-pitch length P of the device shown in FIG. 12H was 172.8 nm. Using equations and figures presented above, the refractive index n of RMM1036 for right circularly polarized light at 535 nm was determined to be 1.548.

Representative Methods for Fabricating a Thin-Film Ch-LCP Device

Figure 13:
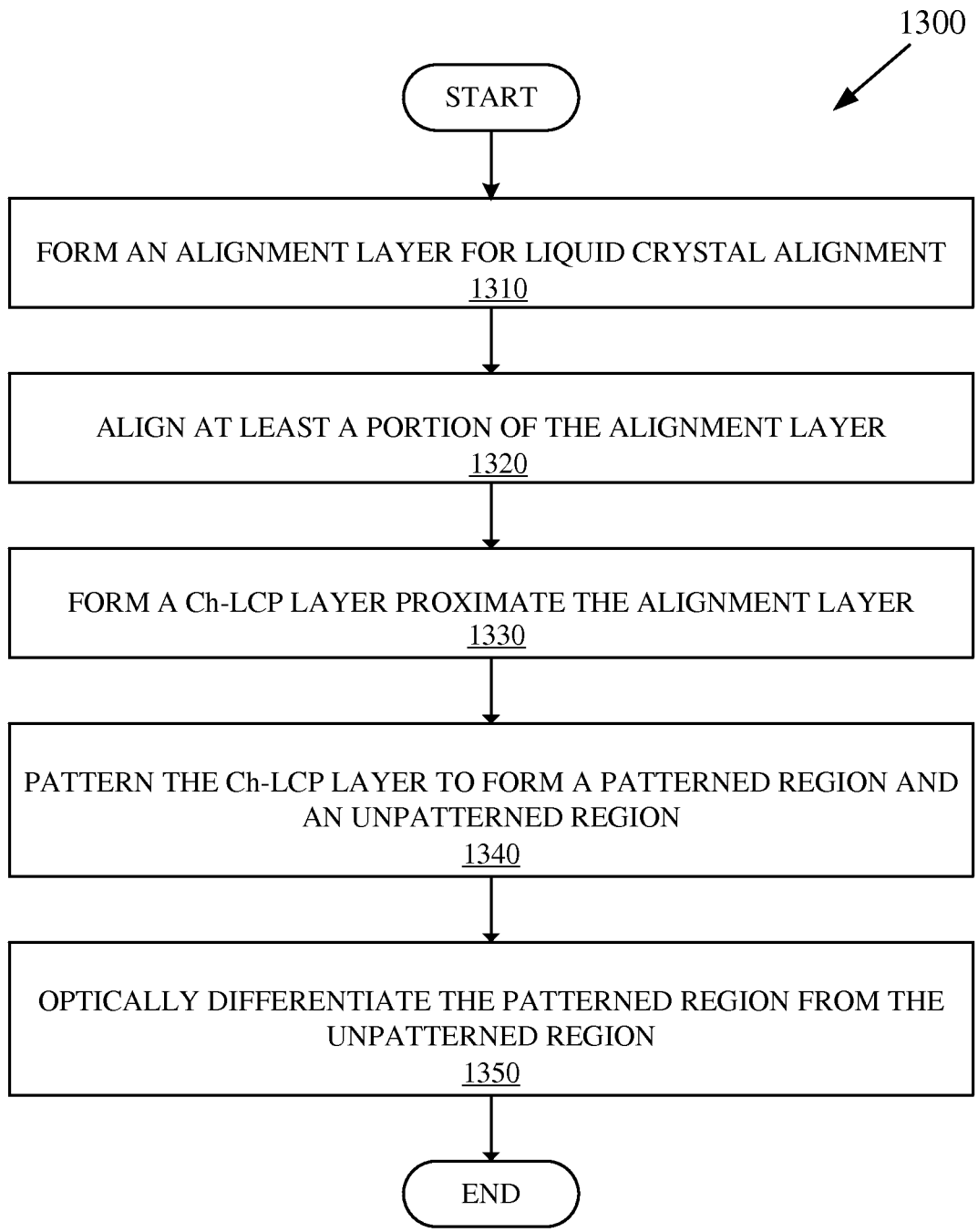
FIG. 13 illustrates a representative embodiment of a method for fabricating a thin-film Ch-LCP device.

FIG. 13 illustrates a representative embodiment of a method 1300 for fabricating a thin-film Ch-LCP device. At 1310, an alignment layer for liquid crystal is formed. In one embodiment, a photopolymerizable polymer network (PPN) layer may be formed on a substrate, such as by spin-coating. In an alternate embodiment, a polyimide layer may be formed on a substrate, such as by spin-coating.

At 1320, at least a portion of the alignment layer formed at 1310 is aligned. After alignment, the alignment layer comprises molecules aligned with each other in at least one alignment direction. In one embodiment, the PPN layer formed at 1310 is generally aligned by exposing the PPN layer to linearly polarized ultraviolet radiation to align molecules of substantially the entire PPN layer generally in an alignment direction. Alternatively, the PPN layer may be patterned to have one or more aligned regions and one or more unaligned regions. For example, the aligned regions are formed by exposure to linearly polarized UV radiation, and the unaligned regions are formed by blocking the linearly polarized UV radiation with a mask.

In an alternative embodiment, a polyimide layer formed on a substrate is mechanically rubbed in the alignment direction. For example, a cloth may be used to rub the polyimide layer. In further alternative embodiments, the alignment layer for liquid crystal is aligned by using a non-contact method. For example, an atomic force microscope is used to align the alignment layer, as described in Wen et al., "Ultrahigh-resolution liquid crystal display with gray scale," *Appl. Phys. Lett.* 76, 1240-1242 (2000), which is hereby incorporated herein by reference in its entirety. In another example, an ion beam is used to align the alignment layer, as described in Doyle et al., "Ion beam alignment for liquid crystal display fabrication," *Nucl. Instrum. Methods Phys. Res. B* 206, 467-471 (2003), which is hereby incorporated herein by reference in its entirety.

At 1330, a Ch-LCP layer is formed proximate to the alignment layer. "Proximate" means sufficiently close, or contacting, so that the alignment of molecules in the alignment layer is able to produce a corresponding alignment of molecules in the Ch-LCP layer. In one embodiment, Ch-LCP material may be spin-coated onto the surface of the alignment layer so that the molecules of the Ch-LCP layer are in contact with the alignment layer and molecules of the Ch-LCP layer are aligned with aligned molecules of the alignment layer. The Ch-LCP layer may be tuned to desired wavelength(s) by correspondingly adjusting the concentration of chiral dopant in the Ch-LCP material. The Ch-LCP layer may be tuned to desired chirality by selecting a right-handed chiral dopant or a left-handed chiral dopant.

At 1340, the Ch-LCP layer is patterned to form patterned region(s) and unpatterned region(s). "Patterning" a polymer layer means differentiating at least one property of one region of the layer from the corresponding property of another different region of the layer. The differentiated regions will generally follow a regular pattern, but a regular pattern is not required. Properties to be differentiated include, but are not limited to, optical and material properties. For example, patterning may comprise polymerizing (or curing) one region of a polymer layer and leaving a different region unpolymerized (or uncured). As another example, patterning may comprise aligning the molecules of a liquid crystal in one region in the cholesteric phase and tuning the molecules of a liquid crystal in a different region in the isotropic phase. As yet another example, patterning may comprise aligning the molecules of a liquid crystal in one region in the planar state of the cholesteric phase and tuning the molecules of a liquid crystal in a different region in the focal conic state of the cholesteric phase.

Patterning the Ch-LCP layer may comprise exposing the Ch-LCP layer to patterned linearly polarized ultraviolet radiation. Specific patterns can be formed using a mask. For example, a patterned chrome-on-quartz mask may be placed between the Ch-LCP layer and a source of linearly polarized light. Thus, a patterned region may be formed by exposing the regions not blocked by the mask to ultraviolet radiation. Exposure to UV radiation can fix the Ch-LCP molecules in the patterned region in a planar or cholesteric phase by polymerization and/or cross-linking. As described above, a Ch-LCP layer in the cholesteric phase will act as a circular polarizer.

At 1350, the patterned region is optically differentiated from the unpatterned region. In other words, the optical properties of the patterned region(s) are made different from the optical properties of the patterned region(s). In one embodiment, the unpatterned region is removed to make the unpatterned region transparent to incident light. The unpatterned region can be removed with a solvent rinse or by dry etching.

In an alternative embodiment, optical differentiation comprises thermal annealing and/or UV curing. For example, the substrate may be heated at a temperature sufficient to cause the liquid crystal of the unpatterned region to enter the isotropic phase. Thermal annealing may include heating the substrate at a temperature higher than the clear-point temperature of the Ch-LCP material. UV curing fixes the unpatterned region in the isotropic phase by polymerizing the unpatterned region when it is in the isotropic phase.

Ch-LCP material in the isotropic phase generally has different optical properties than Ch-LCP material in the cholesteric phase. For example, Ch-LCP material in the isotropic phase may be transmissive to light over a wide spectrum and set of polarizations. In contrast, Ch-LCP material in the cholesteric phase may act as a circular polarizer, reflecting light of one circular polarization and transmitting light of the opposite circular polarization. For example, a left circular polarizer will transmit left-handed circularly polarized light and reflect right-handed circularly polarized light. Further, the Ch-LCP material in the cholesteric phase may be tuned to block more light at one or more selected wavelengths of light as compared to other wavelengths of light by adjusting the chiral dopant concentration. Thus, the patterned region can be optically differentiated from the unpatterned region.

Figure 14:
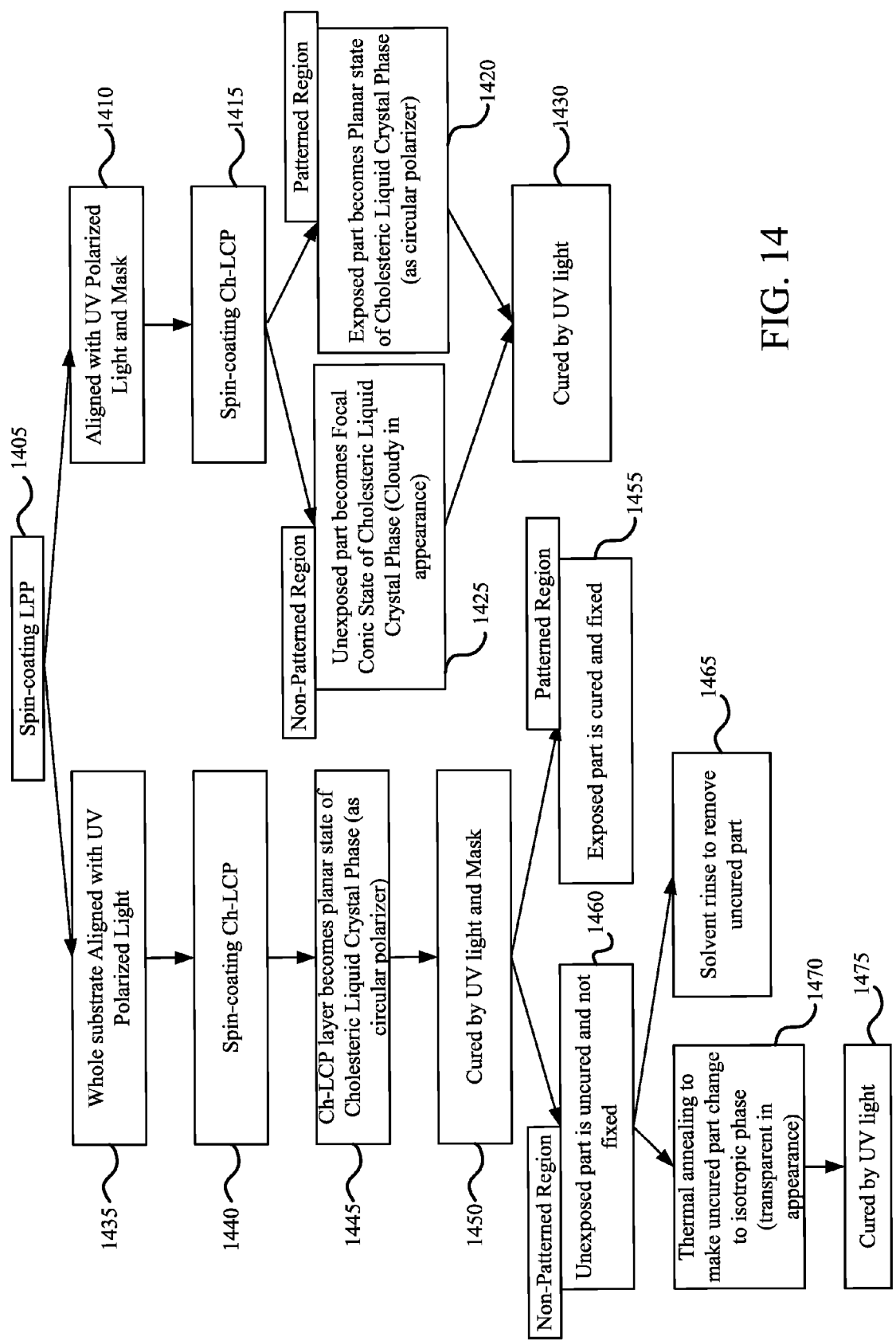
FIG. 14 illustrates three representative embodiments of methods for fabricating a thin-film Ch-LCP device.

In sum, there are generally at least three methods to create patterned Ch-LCP devices. FIG. 14 illustrates three embodiments of these methods. In the first exemplary method, patterning is achieved by patterning the LPP layer. Specifically, at 1405, LPP material is spin-coated on a substrate to form a LPP layer. At 1410, the LPP layer is patterned by selectively exposing one or more regions of the LPP layer to linearly polarized UV light. For example, aligned regions of the LPP layer are formed by exposure to linearly polarized UV radiation, and unaligned regions of the LPP layer are formed by using a mask to block the linearly polarized UV radiation from reaching them. At 1415, a Ch-LCP layer is formed proximate to the LPP layer, such as by spin-coating Ch-LCP material onto the LPP layer. At 1420, the molecules of the Ch-LCP layer proximate to the aligned region of the LPP layer align in the planar state of the cholesteric phase. Liquid crystal molecules aligned in the planar state of the cholesteric phase act as a circular polarizer. At 1425, the molecules of the Ch-LCP layer proximate to the unaligned region of the LPP layer are tuned in the focal conic state of the cholesteric phase. Liquid crystal molecules tuned in the focal conic state of the cholesteric phase usually appear cloudy in appearance. At 1430, the liquid crystal states are fixed by curing with UV light.

In the second and third exemplary methods, patterning is achieved by patterning the Ch-LCP layer. The second and third exemplary methods have the same initial steps. Specifically, at 1405, LPP material is spin-coated on a substrate to form a LPP layer. At 1435, all, or at least a portion, of the LPP layer is exposed to linearly polarized UV light to align and cure the LPP layer. At 1440, a Ch-LCP layer is formed proximate to the LPP layer, such as by spin-coating Ch-LCP material onto the LPP layer. At 1445, the molecules of the Ch-LCP layer align with the alignment of the LPP layer so that the molecules of the Ch-LCP layer are in the planer state of the cholesteric phase. At 1450, the Ch-LCP layer is patterned, such as by directing linearly polarized UV light through a mask. At 1455, the patterned region of the Ch-LCP layer is exposed to linearly polarized UV light to cure and fix the patterned region in the planar state of the cholesteric phase. At 1460, the non-patterned region is unexposed to the UV light because the mask blocks the UV light from reaching the non-patterned region of the Ch-LCP layer. The non-patterned region of the Ch-LCP layer is uncured and not fixed.

At this point, the second and third exemplary methods take different steps to complete the patterned Ch-LCP devices. In the second exemplary method, at 1465, a solvent rinse is used to remove uncured material from unpatterned areas of the Ch-LCP layer. In the third exemplary method, at 1470, the device is thermally annealed so that the unpatterned and uncured part of the Ch-LCP layer changes to the isotropic phase. Liquid crystal in the isotropic phase usually appears transparent in appearance. Finally, at 1475, the molecules in the unpatterned regions of the Ch-LCP layer are cured in the isotropic phase by exposing the Ch-LCP layer to UV light.

In view of the many possible embodiments to which the principles of the disclosed technology may be applied, it should be recognized that the illustrated embodiments are only preferred examples and should not be taken as limiting in scope. We therefore claim all that comes within the scope and spirit of the appended claims.

We claim:
1. A method, comprising:
  forming a photopolymerizable polymer network (PPN) layer for liquid crystal alignment,
  aligning molecules of the PPN layer with each other in at least one alignment direction;
  forming a cholesteric liquid crystal polymer (Ch-LCP) layer proximate the PPN layer so that liquid crystal molecules in the Ch-LCP layer are aligned with the at least one alignment direction; and curing an unpatterned region of the Ch-LCP layer in an isotropic state.

2. The method of claim 1, further comprising:
    forming a patterned region of the Ch-LCP layer; and
    curing the patterned region of the Ch-LCP layer in a cholesteric state.

3. The method of claim 2, wherein curing the patterned region comprises polymerizing liquid crystal molecules of the patterned region by exposing the molecules to ultraviolet light.

4. The method of claim 1, wherein curing the unpatterned region comprises thermal annealing.

5. The method of claim 4, wherein thermal annealing comprises heating the Ch-LCP layer to a temperature greater than a clear-point temperature of the Ch-LCP layer.

6. The method of claim 4, wherein curing the unpatterned region comprises polymerizing liquid crystal molecules of the unpatterned region by exposing the molecules to ultraviolet light.

7. The method of claim 1, further comprising:
    curing a patterned region of the Ch-LCP layer in a cholesteric state; and
    removing an unpatterned region of the Ch-LCP layer.

8. The method of claim 7, wherein removing the unpatterned region of the Ch-LCP layer comprises rinsing with a solvent.

9. The method of claim 1, wherein the Ch-LCP layer comprises a chiral dopant, the method further comprising adjusting a concentration of the chiral dopant to tune the transmittance of a selected wavelength of light through the Ch-LCP layer.

10. A method, comprising:
    on a substrate, forming an alignment layer;
    aligning molecules of the alignment layer with each other in at least one alignment direction;
    forming a cholesteric liquid crystal polymer (Ch-LCP) layer proximate the alignment layer in a patterned manner so that liquid crystal molecules in at least a patterned region of the Ch-LCP layer are aligned to the at least one alignment direction; and
    processing the Ch-LCP layer to produce an optical property of the patterned region of the Ch-LCP layer that is different than a corresponding optical property of an unpatterned region of the Ch-LCP layer.

11. The method of claim 10, wherein:
    the alignment layer comprises a photopolymerizable polymer network (PPN) layer; and
    aligning the molecules of the alignment layer with each other the at least one alignment direction comprises exposing the PPN to linearly polarized ultraviolet radiation.

12. The method of claim 10, wherein processing the Ch-LCP layer comprises exposing at least a selected region of Ch-LCP layer to patterned linearly polarized ultraviolet radiation.

13. The method of claim 10, wherein processing the Ch-LCP layer comprises removing the unpatterned region(s).

14. The method of claim 10, wherein processing the Ch-LCP layer comprises thermal annealing.

15. The method of claim 10, further comprising adjusting a concentration of a chiral dopant added to the cholesteric liquid crystal polymer of the Ch-LCP layer to produce a correspondingly tuned transmittance of a central wavelength of light transmitted through the Ch-LCP layer.

16. The method of claim 10, wherein processing the Ch-LCP layer comprises:
    curing the patterned region in a cholesteric phase; and
    curing the unpatterned region in an isotropic phase.

17. A device, comprising:
    a linear photopolymerizable polymer (LPP) layer having molecules defining at least one alignment direction; and
    a cholesteric liquid crystal polymer (Ch-LCP) layer proximate the LPP layer such that liquid crystal molecules in a patterned area of the Ch-LCP layer are aligned with the at least one alignment direction, and the patterned area of the Ch-LCP layer has different optical properties than an unpatterned area of the Ch-LCP layer.

18. An optical element, comprising a device as recited in claim 17.

19. A device, comprising:
    a substrate;
    an alignment layer situated on the substrate, the alignment layer comprising at least one selected region in which molecules are aligned with each other in at least one alignment direction; and
    a first cholesteric liquid crystal polymer (Ch-LCP) layer situated on the alignment layer, the first Ch-LCP layer including liquid crystal molecules that, in the at least one selected region, are aligned with the at least one alignment direction, wherein the first Ch-LCP layer includes a patterned area and an unpatterned area, the patterned area and the unpatterned area having at least one different optical property.

20. The device of claim 19, wherein the alignment layer is a linear photo-polymerizable polymer (LPP) layer.

21. The device of claim 19, wherein:
    the patterned area of the first Ch-LCP layer is polymerized in a cholesteric phase; and
    the unpatterned area of the first Ch-LCP layer is polymerized in an isotropic phase.

22. The device of claim 21, further comprising a second Ch-LCP layer overlaying at least part of the first Ch-LCP layer.

23. The device of claim 22, wherein:
    the second Ch-LCP layer comprises a patterned region polymerized in a cholesteric phase; and
    the second Ch-LCP layer overlays at least part of the first Ch-LCP layer so that at least part of the patterned region of the second Ch-LCP layer overlays at least part of the unpatterned area of the first Ch-LCP layer.

24. The device of claim 22, wherein:
    the first Ch-LCP layer comprises a chiral dopant having a first handedness; and
    the second Ch-LCP layer comprises a chiral dopant having a second handedness that is opposite the first handedness.

25. The device of claim 22, wherein: the first Ch-LCP layer comprises
    a chiral dopant concentration tuned to a first wavelength; and
    the second Ch-LCP layer comprises a chiral dopant concentration tuned to a second wavelength different from the first wavelength.

26. An optical element, comprising a device as recited in claim 19.

27. An optical filter, comprising:
    a substrate;
    a linear photopolymerizable polymer (LPP) layer supported by the substrate, the LPP layer defining at least one alignment direction;
    a cholesteric liquid crystal polymer (Ch-LCP) layer proximate the LPP layer such that liquid crystal molecules of the Ch-LCP layer are aligned with the at least one alignment direction, the Ch-LCP layer including a patterned area cured in the cholesteric phase; and a layer pair at least partially overlapping the Ch-LCP layer, the layer pair including an PP alignment layer and a liquid crystal polymer (LCP) layer situated so as to align respective molecules thereof with respect to the LPP alignment layer, the LCP layer including a dichroic dye.

* * * * *